(12) United States Patent
Niv

(10) Patent No.: US 7,479,920 B2
(45) Date of Patent: Jan. 20, 2009

(54) OBSTACLE AND TERRAIN AVOIDANCE SENSOR

(76) Inventor: Haim Niv, 4 Shvo Street, Hod-Hasharon 45041 (IL)

( * ) Notice: Subject to any disclaimer, the term of this patent is extended or adjusted under 35 U.S.C. 154(b) by 612 days.

(21) Appl. No.: 10/748,822

(22) Filed: Dec. 29, 2003

(65) Prior Publication Data

US 2004/0178943 A1   Sep. 16, 2004

(30) Foreign Application Priority Data

Dec. 29, 2002   (IL)   ....................................... 153731
Feb. 11, 2003   (IL)   ....................................... 154396

(51) Int. Cl.
*G01S 13/93* (2006.01)
*G01S 13/94* (2006.01)

(52) U.S. Cl. ..................... 342/65; 342/29; 342/176; 342/191; 342/196

(58) Field of Classification Search .............. 342/65
See application file for complete search history.

(56) References Cited

U.S. PATENT DOCUMENTS

| | | | | |
|---|---|---|---|---|
| 2,753,552 A | * | 7/1956 | Hom | 342/191 |
| 3,088,109 A | * | 4/1963 | Meyer | 342/99 |
| 3,188,632 A | * | 6/1965 | Jeromson | 342/141 |
| 3,212,088 A | * | 10/1965 | Alexander et al. | 342/149 |
| 3,218,639 A | * | 11/1965 | Mercer et al. | 342/90 |
| 3,362,024 A | * | 1/1968 | Badewitz | 342/63 |
| 3,369,231 A | * | 2/1968 | Foral | 342/29 |
| 3,701,989 A | * | 10/1972 | Calhoon, Sr. et al. | 342/147 |
| 3,810,175 A | * | 5/1974 | Bell | 342/183 |
| 4,034,373 A | * | 7/1977 | de Pierre et al. | 342/100 |
| 4,321,601 A | * | 3/1982 | Richman | 342/25 C |
| 4,442,431 A | * | 4/1984 | Bleakney | 342/62 |
| 4,536,763 A | * | 8/1985 | von Pieverling | 342/107 |
| 4,536,764 A | * | 8/1985 | Freeman | 342/91 |
| 4,546,354 A | * | 10/1985 | Boles | 342/179 |
| 4,546,355 A | * | 10/1985 | Boles | 342/179 |
| 4,555,706 A | * | 11/1985 | Haupt | 342/81 |
| 4,563,686 A | * | 1/1986 | Boles | 342/25 C |
| 4,589,610 A | * | 5/1986 | Schmidt | 244/3.19 |
| 4,675,678 A | * | 6/1987 | Klingenschmitt et al. | 342/34 |
| 4,737,788 A | * | 4/1988 | Kennedy | 342/29 |

(Continued)

FOREIGN PATENT DOCUMENTS

EP   0 434 064   6/1991
RU   2 128 846   4/1999

OTHER PUBLICATIONS

Barton, D. K.; "Modern Radar System Analysis;" Jun. 1998; Artech House Library; p. 421.

(Continued)

*Primary Examiner*—Matthew Barker
*Assistant Examiner*—Matthew M Barker

(57) ABSTRACT

A method and apparatus for terrain mapping and/or obstacle detection for aircraft, including (a) transmitting a non-scanning beam that illuminates the terrain and/or obstacles; (b) receiving a Doppler shifted signal that is Doppler frequency shifted by an amount dependent on an angle between a line of flight of the aircraft and scatterers that reflect the transmitted beam; (c) determining the angle from the Doppler frequency; (d) determining the range of at least some of said scatterers; and (e) determining the azimuth and elevation of the scatterers.

63 Claims, 14 Drawing Sheets

U.S. PATENT DOCUMENTS

| | | | |
|---|---|---|---|
| 4,746,924 A * | 5/1988 | Lightfoot | 342/453 |
| 4,902,126 A | 2/1990 | Koechner | |
| 5,086,396 A * | 2/1992 | Waruszewski, Jr. | 701/221 |
| 5,172,125 A * | 12/1992 | Peregrim et al. | 342/154 |
| 5,196,854 A * | 3/1993 | Mathews | 342/26 B |
| 5,196,855 A * | 3/1993 | Kuroda | 342/37 |
| 5,339,085 A * | 8/1994 | Katoh et al. | 342/180 |
| 5,361,072 A * | 11/1994 | Barrick et al. | 342/133 |
| 5,369,589 A * | 11/1994 | Steiner | 701/200 |
| 5,451,957 A * | 9/1995 | Klausing | 342/25 F |
| 5,465,142 A | 11/1995 | Krumes et al. | |
| 5,552,787 A * | 9/1996 | Schuler et al. | 342/25 A |
| 5,555,175 A * | 9/1996 | D'orso | 701/5 |
| 5,608,407 A * | 3/1997 | Jain et al. | 342/126 |
| 5,847,673 A | 12/1998 | DeBell | |
| 5,936,552 A * | 8/1999 | Wichgers et al. | 340/963 |
| 5,945,926 A * | 8/1999 | Ammar et al. | 340/970 |
| 6,278,409 B1 | 8/2001 | Zuta | |
| 6,317,076 B1 * | 11/2001 | Ameen et al. | 342/174 |
| 2008/0012751 A1 * | 1/2008 | Owens et al. | 342/62 |

OTHER PUBLICATIONS

Barton, D. K.; "Modern Radar System Analysis" Jun. 1998; Artech House Library; Section 11.2; pp. 512-531.

Barton D. K.; "Modern Radar System Analysis;" Jun. 1998; Artech House Library; pp. 529-530.

Kerr, D. E.; "Propagation of Short Radio Waves;" 1951; MIT Radiation Laboratory series; vol. 13; Sec. 6; pp. 445-469.

Meade, J. E. "Guidance: Target Considerations;" 1955; Locke, A. S. Ed.; Princeton, NJ; Chapter 11, pp. 435-444.

Skolnik, M. I.; "Introduction to Radar Systems;" 2001; Third Edition; "Third Generation MTD for the ASR-9;" p. 147.

Skolnik, M. I.; "Introduction to Radar Systems;" 2001; Third Edition; pp. 261-262.

Skolnik, M. I.; "Introduction to Radar Systems;" 2001; Third Edition; "Second Generation MTD;" p. 146.

Stimson, G. W.; "Introduction to Airborne Radar;" 1983 Edition; p. 561.

* cited by examiner

OBSTACLE AND TERRAIN AVOIDANCE SENSOR

FIELD OF THE INVENTION

The present invention is related to the field of terrain and obstacle avoidance for aircraft.

BACKGROUND OF THE INVENTION

Controlled flight into terrain (CFIT) and collision with obstacles account for a large percentage of severe and fatal helicopter and other aircraft accidents, especially at night, adverse weather and otherwise bad visibility. The need for a device that would provide adequate warning against obstacles and CFIT for military aircraft is well known. The need also exists for commercial aircraft which are required to fly low, take off from, and land at unprepared and unknown sites, frequently at night and in adverse weather. These include medical evacuation (MEDEVAC), search and rescue (S&R) and police helicopters.

Many schemes have been devised in order to provide the required warnings. Most of these can be divided into two categories:

The first category includes systems which rely on an accurate navigation system, such as the global positioning system (GPS), and a stored data base of the terrain. An example is the enhanced ground proximity warning system (EGPWS) made by Honeywell. The main shortcoming of this category is that there is no assurance that the database is up to date and that there is no new obstacle (such as a pole) that has just recently been erected and does not appear in the database. Another shortcoming of the category is the reliance on GPS or a comparable navigation system, which may not always be available, or in the case of a military mission, might be jammed.

The second category includes systems which rely on real beam mapping, such as millimeter wave (MMW) or laser radars. Both MMW and laser sensors generally use mechanical scanning, which contributes to high cost, high weight and low reliability. Short wavelength (MMW or laser) requires expensive components. Furthermore, short wavelength radiation does not penetrate rain, fog, smoke and dust well and laser has a difficulty looking into, or close to the direction of the sun.

A method which uses radar with Doppler spectrum analysis, is described in Russian patent publication RU 2128846 This method provides the height of discrete obstacles, which is measured through the width of a Doppler spectrum. The Russian patent method does not describe 3D mapping of the terrain in front of the aircraft, nor does it address obstacles and terrain features which extend above the flight plane.

A method for elevation measurement, based on Doppler and azimuth is described in U.S. Pat. No. 5,847,673. The patent describes using a narrow, steerable antenna beam. It obtains object coordinates by first calculating it in antenna coordinates, then transforming it to aircraft or inertial coordinates. Mapping or terrain avoidance are not disclosed.

A method for SAR mapping around the line of flight is disclosed in European patent publication EP 0 434 064. This publication describes a scheme of suppressing a symmetrical range-Doppler cell, without the use of a null in the antenna beam, and without the need to average out the effect of residual signal from the "symmetrical" cell. It assumes that the cell is geometrically symmetrical to the cell of interest. This assumption is true when terrain is flat and is not inclined sideways relative to the flight plane (also when terrain is flat and horizontal). The assumption is not true for other terrain, meaning that the "symmetrical" cell may not be geometrically symmetrical and suppression of it may not be complete, resulting in an error in measuring the azimuth of the cell of interest. The method described does not measure elevation, and therefore cannot provide 3D mapping.

Definitions and Explanations of Certain Terms

The Line of Flight (LOF) is a line which coincides with the velocity vector of the aircraft. The aircraft's longitudinal axis (ALA), on the other hand, is a geometrical line that can be rigidly defined for the aircraft's fuselage. FIG. 1 shows the difference between the ALA 12 and LOF 14 for a helicopter 10.

LOF and ALA do not necessarily coincide. The angular displacement between the two is dependent on flying conditions. As an example, in the final stage of landing, the ALA may point above the horizon, while the LOF points below the horizon.

A horizontal plane view of ALA and LOF will show that they do not necessarily coincide in the horizontal plane either, again, depending on flight conditions. The most common cause for a sustained difference between the two in the horizontal plane is side wind, which causes the aircraft to drift aside.

While the ALA is rigidly tied to the airframe and its orientation can be supplied by horizontal and directional gyros (used for instrument flying) or otherwise by the navigation (NAV) system, LOF requires calculation. It can be supplied, for example, fully or partially from the aircraft's NAV system.

The flight plane (FP) is a plane determined by the LOF and a horizontal line perpendicular to it.

The term "FFT", as used herein is used as a generic term to cover methods of spectral analysis of signals. It includes Fast Fourier Transform, other methods of spectral analysis or its equivalent coherent integration, for ease and simplicity of expression. It should be understood though that other ways to perform spectral analysis are also included and can be used in some embodiments of the invention.

SUMMARY OF THE INVENTION

An aspect of some embodiments of the invention is concerned with a novel methodology of terrain mapping and/or collision avoidance and apparatus for carrying out the methodology.

In an embodiment of the invention, a wide angle, optionally pulse modulated, radar signal illuminates ahead of an aircraft. Signals received by the radar will be Doppler shifted by a frequency that is proportional to the velocity of the aircraft and the cosine of the angle between the direction of the aircraft velocity and an obstacle/terrain cell that scatters a signal toward the radar. Thus all signals having a given Doppler shift are, at least in principle, the result of obstacles/terrain cells situated on the surface of a circular conical surface, whose axis is in the direction of the line of flight and whose angle is defined by the Doppler shift, which is determined in turn by the velocity of the aircraft and the wavelength of the signal emitted by the radar.

In general, a signal received from a real scene will be the result of a large number of obstacles/terrain cells (scatterers) at different conical angles. The conical angle in which particular obstacles are situated can be determined by analyzing the received signal to determine the Doppler shift of the received signal. This analysis can be carried out by FFT analysis or by other methods that provide a series of frequency filters, each corresponding to a different band range of conical angles.

One of the azimuth and elevation are then determined by conventional means and the other of azimuth and elevation is calculated from the determined value. Range is determined, for example, by measuring the echo delay, in respect to the transmitted pulse.

The result assigns a number of possible positions for each scatterer. A number of methods, which generally are relatively quick and easy to implement can be utilized to remove this ambiguity.

Range is divided into range gates, and the FFT is done separately for each range gate, and in parallel for all gates. Each Doppler filter that results belongs to a certain range gate, covers a certain portion of the Doppler spectrum and constitutes a range-Doppler cell, representing a terrain cell/obstacle/object. The process results therefore in a matrix, containing n×m cells, where n is the number of range gates and m is the number of Doppler filters. In principle, azimuth and elevation is found for each cell.

There is thus provided, in accordance with an embodiment of the invention, a method of terrain mapping and/or obstacle detection for aircraft, comprising:

(a) transmitting a non-scanning beam that illuminates the terrain and/or obstacles;

(b) receiving a Doppler shifted signal that is Doppler frequency shifted by an amount dependent on an angle between a line of flight of the aircraft and scatterers that reflect the transmitted beam;

(c) determining the angle from the Doppler frequency;

(d) determining the range of at least some of said scatterers; and (e) determining the azimuth and elevation of the scatterers.

In an embodiment of the invention determining the azimuth and angle comprises:

determining one of azimuth and elevation of the scatterers by direction finding;

calculating the other of the azimuth and elevation from the angle and determined azimuth and elevation.

Optionally, determining the azimuth or elevation comprises determining using an off-axis monopulse azimuth estimation scheme. Optionally, determining the azimuth or elevation comprises determining using interferometry.

In an embodiment of the invention, the method includes:

displaying a three dimensional map in which cells defined by different values of azimuth, elevation and range containing a backscatter signal are located.

In an embodiment of the invention, the method includes:

displaying a three dimensional terrain map in which the relative backscatter intensity of cells defined by different values of azimuth, elevation and range is expressed.

In an embodiment of the invention, the method includes:

generating and displaying sky-line contours based on cells defined by different values of azimuth, elevation and range.

Optionally, the method includes backscatterers which are at lower elevation and lower range than the skyline. Optionally, the method includes displaying at least one safety circle and optionally a plurality of safely circles, superimposed on the skyline display.

Optionally, the method includes aural or visual warnings when the vehicle is moving in an unsafe direction.

In an embodiment of the invention, determining the angle comprises:

providing a plurality of signals, each representing the strength of the Doppler shifted signal from a scatterer in one of a plurality of adjacent, overlapping, frequency ranges; and determining the frequency of the Doppler frequency signal by interpolation based on the signal strengths.

In an embodiment of the invention, determining the angle comprises:

performing spectral analysis, in which at least some signals from scatterers falls within one of a plurality of Doppler filters, said Doppler filter containing said signal determining the Doppler shift of the signal, from which the angle is calculated.

Optionally, determining the angle includes:

repeating at least (a) and (b) and optionally (c) a plurality of times; and averaging the determined Doppler shifted frequencies or angles determined in each repeat.

Optionally, only a limited range of angles about the line of flight is determined using a limited range of Doppler frequencies.

In an embodiment of he invention, a backscatter Doppler signal from a terrain cell or object, belonging to the range-Doppler cell of interest and located on the opposite side of the aircraft's line of flight is suppressed by a null, common to both sum and difference patterns of the antenna. Optionally, an error resulting from a residue of the suppressed backscatter is averaged out by summing or averaging multiple measurements, taken at a single frequency or at multiple frequencies. Optionally, said multiple measurements are performed at different frequencies and wherein pulses of the transmitted radiation at different frequencies are transmitted seriatim, in an interleaved manner. Optionally, determination of the angle by spectral analysis of the reflections for the different frequencies are performed in parallel, utilizing said interleaved pulses.

In an embodiment of the invention, the method includes resolution of elevation ambiguity comprising:

determination of skyline contours, possibly containing tall, discrete obstacles, from said elevation, range and azimuth, said skyline contours including an upper contour and a lower contour, only one of which is real;

if the area between the contours is substantially empty of measured scatterers, then the lower contour is chosen as the real contour; and if the area between the contours contains a substantial number of scatterers, then the upper contour is chosen as the real contour.

Optionally, if parts of the contours have scatterers between them and other parts do not, each such part is treated separately according to said acts of determination of skyline contours. Optionally, the method includes displaying only the chosen contour on a visual display.

In an embodiment of the invention, if the determination of angle, azimuth and range results in an elevation ambiguity of a surface contour, wire or tall discrete obstacle indication, the method includes resolving the ambiguity by a pull-up or push-down maneuver of the aircraft.

Optionally, if the maneuver is a pull-up maneuver that causes the upper and lower contours or wire or tall discrete obstacle indication to move apart from each other, then the lower contour or indication is determined to be the correct contour or indication and vice-versa; and if the maneuver is a push-down maneuver that causes the upper and lower contours or indications to move apart from each other, then the upper contour or indication is determined to be the correct contour or indication, and vice-versa.

In an embodiment of the invention, if the determination of angle, azimuth and range results in an elevation or azimuth ambiguity of a surface contour or wire or tall discrete obstacle indication, the method includes:

resolving the ambiguity by pointing a null in the elevation or azimuth pattern of the antenna to either or both of the indications of a scatterer;

sensing a difference in the object's backscattered power; and choosing the direction of the null which caused a decrease of received power as the actual direction.

In an embodiment of the invention, ground reflections are separated from actual object backscatter, based on the difference in Doppler shift between the object backscatter and the ground reflections.

Optionally, when the differences in Doppler shift are quantized to form a plurality of ranges of Doppler shift defining a plurality of ranges of the angle, ground reflections detected in a same range of distances as the actual object are separated from the object, based on their falling in different ranges of Doppler shift.

Optionally, when the differences in Doppler shift are quantized to form a plurality of ranges of Doppler shift defining a plurality of ranges of the angle, and the effect of ground reflections is detected in a same range of Doppler shifts and distances as the actual object, is reduced by pointing a null in the antenna pattern towards the general direction of the reflection sources at an elevation angle lower than that indicated by the combined directly reflected and ground reflected signals.

In an embodiment of the invention in which the incorrect one of ambiguous indications of a scatterer determined by direction finding is suppressed and including further reducing the effect of the incorrect indication by performing multiple measurements at different frequencies and averaging the results. Optionally, the multiple measurements at different frequencies are made by pulsing the non-scanning radiation and by interleaving pulses of different radar frequencies.

In an embodiment of the invention, the method includes deducing of the presence of a wire based on detection of a regular spacing between point obstacles, indicating that these obstacles may be pylons, carrying wires.

In an embodiment of the invention, the method includes:

detecting suspended wires, based on normal impingement of said beam; and determining the orientation of the wire by:

irradiating the wire with radiation at two orthogonal polarizations; and determining the presence of the wire from a ratio of received backscatter intensities in the two polarizations.

Optionally, the method includes determining the orientation of wire by rotating the polarization and finding a pair of orthogonal polarizations for which the ratio of intensities of received backscatters is above a certain threshold, the wire being parallel to the orientation which produced the stronger backscatter In an embodiment of the invention, the method includes including determining the horizontal orientation or wires at low elevation, comprising:

determining azimuth of wire's reflection point; and estimating the horizontal orientation as the normal to the determined azimuth.

Optionally, the method includes determining the orientation of a wire in the vertical plane, provided a point of normal incidence is at low elevation, and where the slant angle of the wire is parallel to the polarization that produced the stronger backscatter.

Optionally, the method includes determining the wires orientation in space, where the PNI need not be limited to low elevation, said determining comprising:

a) determine the azimuth and elevation of line of sight to a detected point of normal incidence;

b) determining a plane normal to the line of sight at the point of normal incidence; and c) determining a line in the plane, parallel to the polarization which produced the stronger, polarization, said line estimating the direction of the wire.

In an embodiment of the invention, results from a number of adjacent Doppler filters, corresponding to backscatter from at least one sector away from the aircraft's line of flight, are summed or averaged. Optionally, results from sectors relatively closer to the line of flight are either not summed or averaged or are summed or averaged to a lesser extent than those farther from the line of flight.

In an embodiment of the invention, the method includes:

detecting suspended wires, based on normal impingement of said beam; and discriminating wires from other objects when the reflecting point on the wire appears to be at constant azimuth as the aircraft advances, as long as the wire and the line of flight are in the same plane.

Optionally, discriminating wires from other objects is further based on a discontinuity of backscatter in the elevation plane, when no backscatter comes from elevations between the wire's reflection point and the ground.

There is further provided, in accordance with an embodiment of the invention, a method of terrain mapping and/or obstacle detection for aircraft, comprising:

(a) transmitting a non-scanning beam that illuminates the terrain and/or obstacles;

(b) receiving a Doppler shifted signal that is Doppler shifted by an amount dependent on an angle between a line of flight of the aircraft and scatterers that reflect the transmitted beam;

(c) determining the angle of an object nearest to the line of flight at a certain range; and (d) displaying a distorted contour in the form of a half circle around the line of flight, whose radius represents the angular distance of this object from the line of flight.

Optionally, the method includes displaying a number of distorted contours for a number of ranges, along with a number of safety circles for corresponding ranges.

Optionally, the method includes making a coarse determination of azimuth, providing rough azimuth of large objects.

In an embodiment of the invention, the method includes determining the horizontal orientation or wires at low elevation, said determining comprising:

determining azimuth of wire's reflection point; and estimating the horizontal orientation as the normal to the determined azimuth.

There is further provided, in accordance with an embodiment of the invention, a method of performing radar measurements through Doppler analysis processes, including:

interlacing pulses having different attributes of frequency, antenna connection, beam position or polarization; and utilizing the Doppler shifts of reflections of the interlaced pulses to perform spectral analysis of the reflections at different attributes, in parallel.

Optionally, the method includes:

detecting suspended wires, based on normal impingement of said beam; and determining the orientation of the wire by:

irradiating the wire with radiation at two orthogonal polarizations; and determining the presence of the wire from a ratio of received backscatter intensities in the two polarizations.

Optionally, the method includes determining the horizontal orientation or wires at low elevation, said determining comprising:

determining azimuth of wire's reflection point; and
estimating the horizontal orientation as the normal to the determined azimuth.

In an embodiment of the invention, the spectral analysis comprises FFT.

In an embodiment of the invention, the attributes comprises frequency.

In an embodiment of the invention, the attributes comprise polarization.

In an embodiment of the invention, the attributes comprise antenna connection.

In an embodiment of the invention, the attributes comprise beam position.

There is further provided, in accordance with an embodiment of the invention, radar apparatus for terrain mapping and/or obstacle detection for aircraft, comprising:
   a transceiver that is operative to emit a non scanning antenna beam and to receive signals reflected from said terrain and obstacles; and
   a processor that includes:
      a Doppler signal analyzer that receives said signals and determines an angle between scatterers associated with the signal and a line of flight of the aircraft;
      direction finding that determines one of azimuth and elevation of the scatterers; and
      a computer that computes the other of the azimuth and elevation from the determined azimuth or elevation.

Optionally, the apparatus comprises a monopulse antenna which has a steerable null, common to both sum and difference lobes.

There is further provided, in accordance with an embodiment of the invention, a method of polarization stabilization in a radar in which transmitted radiation is polarized during turns or other flight conditions, comprising:
   determining a roll angle of the aircraft; and
   rotating the polarization to compensate for the roll angle of the aircraft.

There is further provided, a method of providing wire detection capability, comprising:
   determining a line of flight of an aircraft; and
   detecting wires over an angle of over ±70° in azimuth about the line of flight.

Optionally, the angle is equal to or below ±90°; optionally it is above ±90°.

BRIEF DESCRIPTION OF THE DRAWINGS

Exemplary, non-limiting, embodiments of the invention are described with respect to the attached drawings in which.

DETAILED DESCRIPTION OF EXEMPLARY EMBODIMENTS

Doppler Processing

Figure 1:
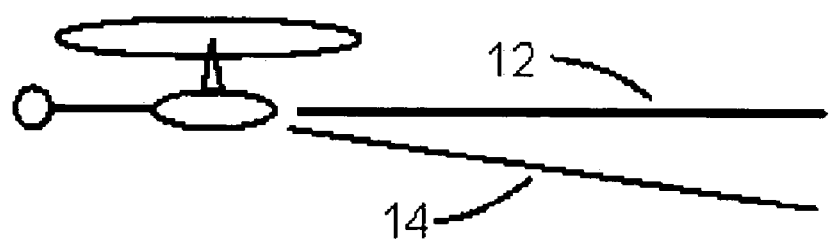
FIG. 1 shows the difference between the aircraft's longitudinal axis and the line of flight.
Figure 2:
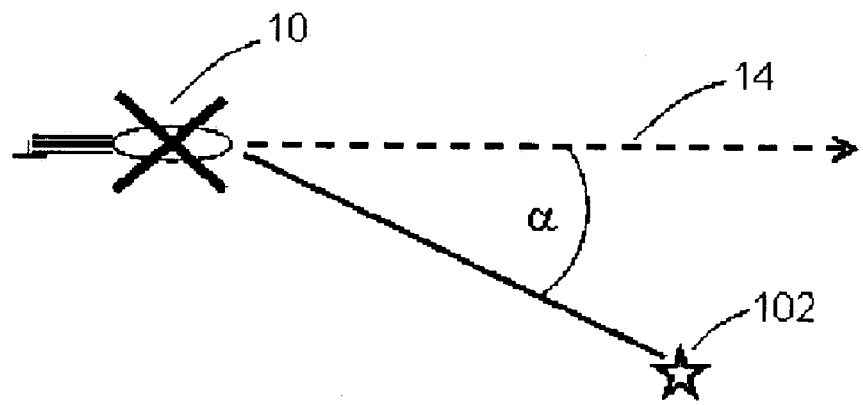
FIG. 2 illustrates the geometry which effects the relation between the Doppler shift of an object and its angular position in relation to the line of flight.

FIG. 1 shows an airborne vehicle 10, such as a helicopter moving in a direction shown by Line of Flight (LOF) 12, at a velocity $V_g$. The Doppler shift, $f_d$ of the reflection of a terrain element 102 in an airborne radar is proportional to the cosine of α, the angle between the LOF and the terrain element and is equal to:

$$f_d = (2v_g \cos \alpha)/\lambda \qquad \text{(Eq. 1)}$$

where λ is the wavelength of the radar irradiation.

If vehicle 10 flies at a very low altitude over horizontal, flat terrain, then spectrum analysis of the signal received effectively divides the sector of terrain covered by the radar into many narrow sectors, where each portion of Doppler spectrum represents two terrain sectors, symmetrically located about the LOF. Two such sectors 310 and 312 are shown in FIG. 3.

Figure 4:
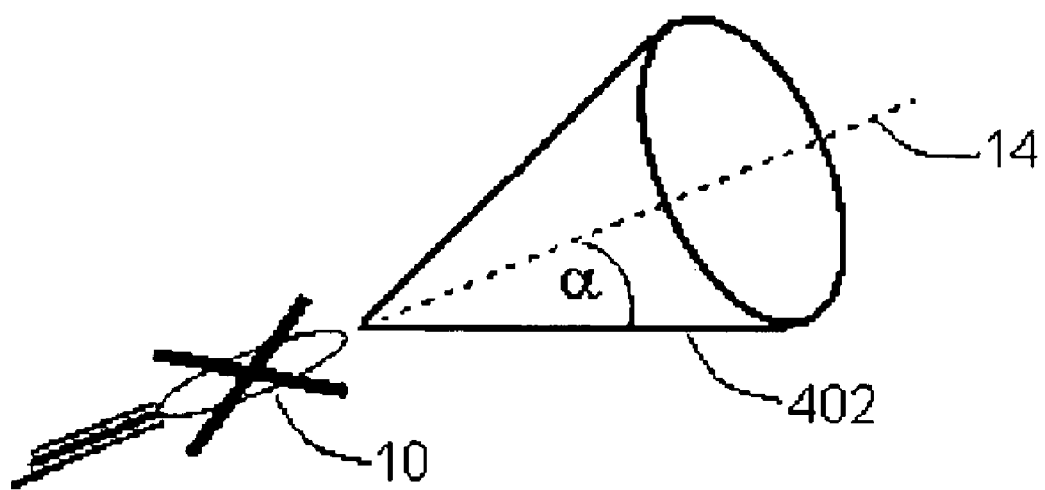
FIG. 4 shows a conical surface, indicating the location of objects returning a signal with a given Doppler shift.

This principle, known as Doppler beam sharpening (DBS) is applicable not only to a horizontal plane, but to any plane containing the LOF, at any orientation, including the vertical plane. Therefore, α effectively defines a cone 402 whose axis extends from the radar antenna along the LOF, as illustrated in FIG. 4. Any radar reflector on the surface of the cone has a Doppler shift which corresponds to α, as stated by Eq. 1 above.

Figure 3:
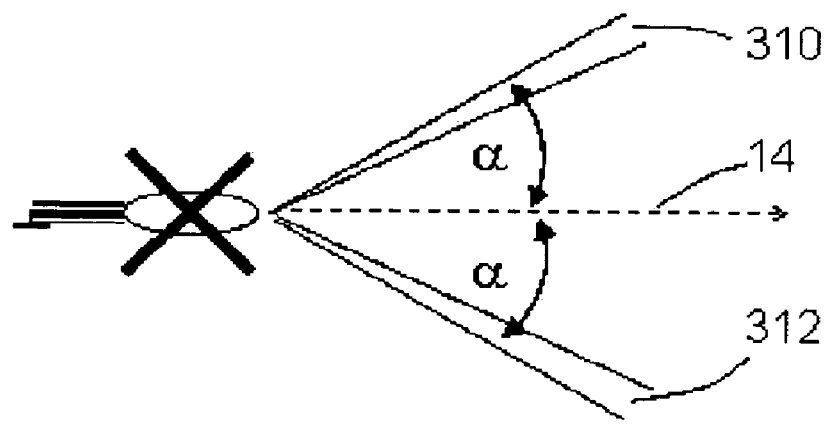
FIG. 3 shows how, at low flight altitude, a Doppler filter represents two sectors on the terrain.

In fact and as already suggested in FIG. 3, as each Doppler filter has a certain bandwidth $\Delta f_d$, radar reflectors which are detected through a Doppler filter will be located between the surfaces of two cones, having opening angles of (2α−Δα) and (2α+Δα), where Δα corresponds to $\Delta f_d$ and the relation is expressed by:

$$\Delta\alpha \approx -\lambda \Delta f_d / 2v_g (\sin \alpha). \qquad \text{(Eq. 2)}$$

Accuracy of the equation is degraded as α decreases.

Figure 5:
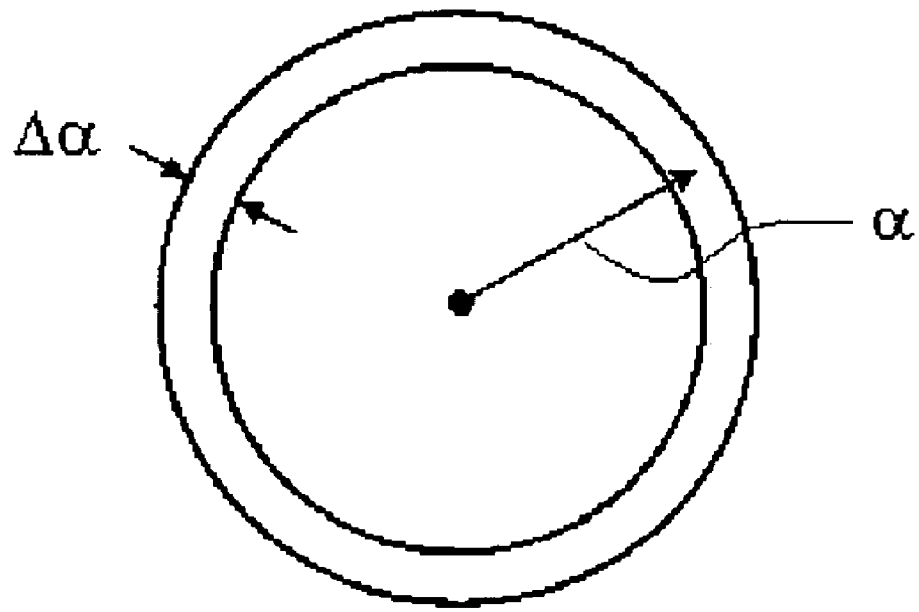
FIG. 5 shows a section of two conical surfaces related to a Doppler filter, in a plane perpendicular to the line of flight.

Along the LOF, the cross section of the two cones are two coaxial circles which form a ring, representing a range Δα, of α values as shown in FIG. 5. The radar reflectors which were detected through the specific Doppler filter at the range gate of the ring are located within this ring, that is, within this range of α values.

Figure 6:
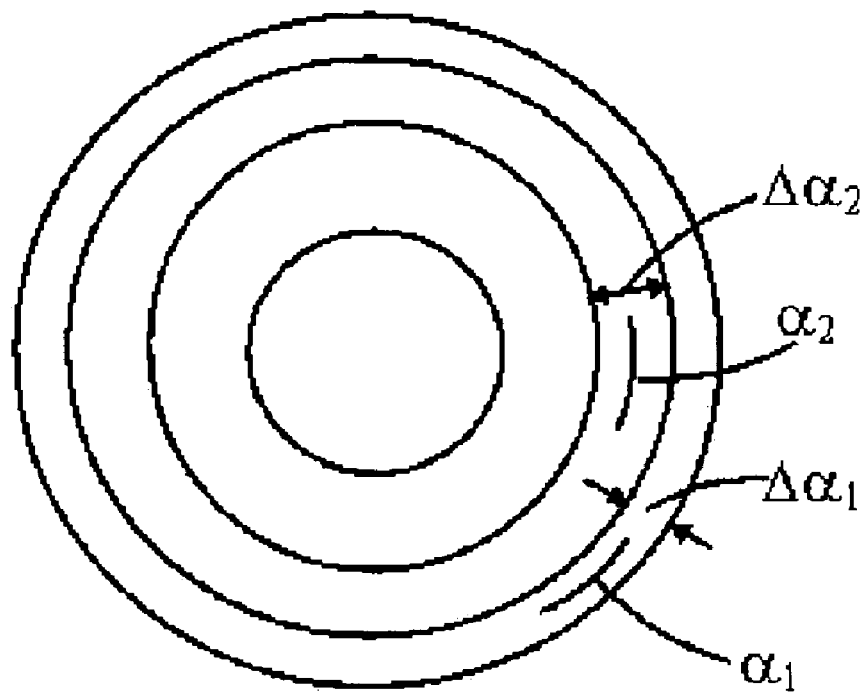
FIG. 6 shows section of conical surfaces, representing a plurality of Doppler filters.

Doppler filters resulting from an FFT (or other spectrum analysis) process create a set of contiguous coaxial rings, each "containing", reflections received through a different Doppler filter, and having, each, different α and Δα values as illustrated by FIG. 6.

As suggested in FIG. 6, the rings become thicker as α becomes smaller, due to the dependence on (sin α) in Eq. (2) above. The inner circle represents a Doppler filter which covers the highest Doppler frequency range and the lowest α. The center of the inner circle (and all other rings), represents the LOF.

As indicated above α is known from the Doppler filter number, or the number of the corresponding ring. This means that there is an uncertainty in regard to the value of α of an object, as expressed by Eq. 2 above, and this uncertainty increases as the object is closer to the LOF (that is, as α gets smaller). Aside from refining the FFT process in order to reduce the bandwidth of the Doppler filters (as described below), there are a number of ways to improve Doppler measurement accuracy, applicable mainly to distinct objects—such as point obstacles and reflection points of wires (points of normal impinging—PNI). Some of these are described below.

Figure 7:
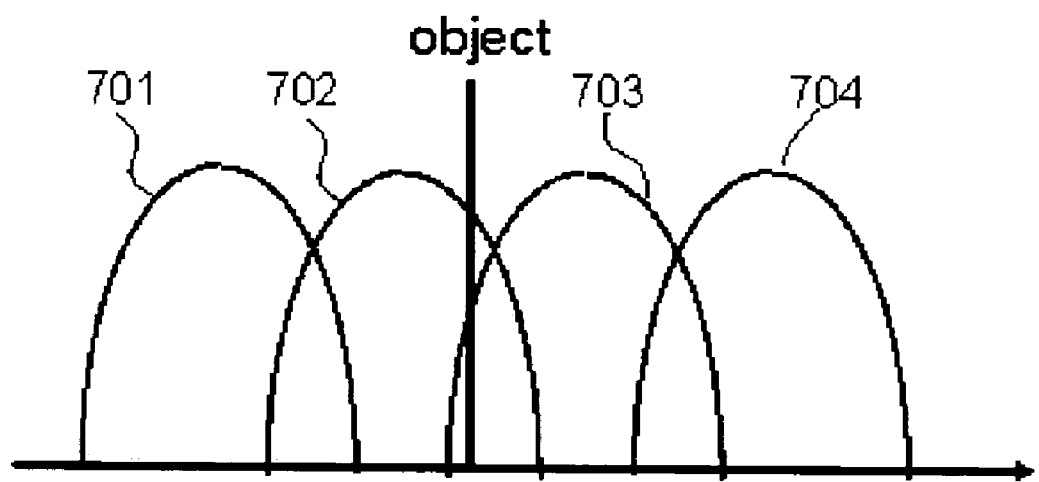
FIG. 7 shows a number of contiguous Doppler filter responses on the frequency axis, with a narrow spectrum of an object's backscatter.

One way to improve accuracy is by interpolation. FIG. 7 shows a series of overlapping Doppler filters 701, 702, 703, 704. Consider an object whose Doppler frequency lies within Doppler filter 702, as illustrated in FIG. 7. As the filters overlap, the object will be detected by both filter 702 and 703. However, there will be a difference in the detected signal levels received through the two filters, because the object's Doppler is closer to the center of filter 702. From the ratio between the two signal levels, a more exact value of $f_d$ and α can be found through interpolation, in much the same way as it is done in a Direction Finding (DF) process. In fact, a more elaborate process is required, because in many cases the object may be detected by filter 701 and other filters as well. The process is similar to a DF process in a multibeam antenna (such as implemented with the Rotman lens or Butler matrix).

The Doppler interpolation process has been shown to improve Doppler accuracy and resolution by a ratio of 8. To have an idea of the angular accuracy that can be achieved near the LOF (where it is needed most but is most difficult to achieve), assume, as an example, an FFT process of 64 points (and therefore 64 Doppler filters). The Doppler which corresponds to the value of the ground velocity vector is set to fall in filter # 62, to allow interpolation near this velocity, meaning also near the LOF. The angle off the LOF, spanned by filter # 63 is about 10°. If a resolution improvement ratio of only 6 is assumed here, then an accuracy of around 1.7° can be expected.

An additional improvement of accuracy can be gained by on going averaging of successive results of α, which are each produced after completion of an FFT cycle. This improvement is significant especially when the results have degraded accuracy due to a low signal to noise ratio. It should be understood that the interpolation and averaging processes should be done on recorded signals which belong to the same range gate.

A further improvement in estimating the position of a cell/object, has to do with its angular movement in relation to the LOF. Such movement is expected from all objects as the aircraft advances, except for objects which are very close to the LOF or wires which lie in a plane that contains the LOF. This improvement can be achieved by employing track smoothing, such as provided by the Kalman filter.

As mentioned above, as α increases, the rings, and sectors on the ground become thinner, resulting in diminishing radar cross section (RCS) of the terrain elements. Combined with a possible decrease in antenna gain in these angles, this effect means that more transmitted power is required for terrain which is away from the LOF, if the same range performance is to be maintained at these angles. One way of addressing this problem is to determine that reduced range performance at these angles is allowed, because the closing velocity to terrain elements at these angles is lower, and the time to possible impact into them is increased.

However, there is also a way to compensate for the reduced RCS. As sectors at these angles are narrower, adjacent sectors can be combined without becoming too wide, and without surpassing the width of sectors that are closer to the LOF. The combination of these sectors can be done by summing the values recorded from a number of adjacent filters (belonging to the same range gate). The summing is equivalent to the well known post detection integration (PDI) process, and will result in a processing gain which will depend mainly on the number of integrated values.

It should be noted that as the sector of interest in front of the aircraft does not extend to ±90° (it may typically extend to ±20°) not all Doppler filters have to be implemented. However, if detection of wires is desired, as described below, then the sector of interest is wider.

Brief Description of an Exemplary Apparatus

Figure 8:
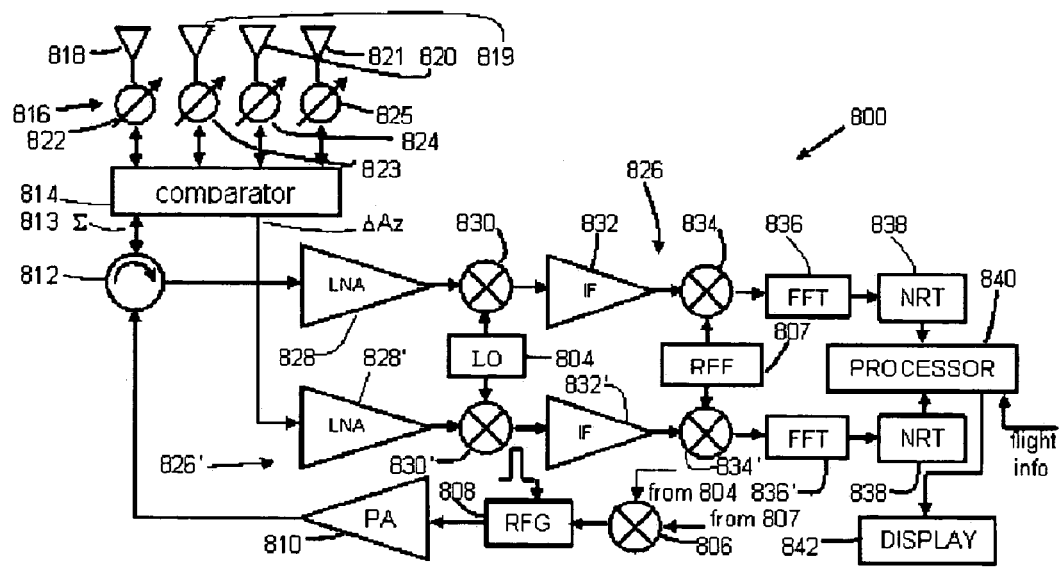
FIG. 8 is a general block diagram of a radar system according to an embodiment of the invention.

While the principles of operation are not yet completely described, it is now appropriate to introduce an exemplary embodiment of apparatus for carrying out the method. FIG. 8 shows a schematic circuit diagram of an exemplary radar apparatus 800, according to an embodiment of the invention.

As shown radar apparatus 800 comprises standard equipment, and is distinguishable from the prior art, mainly in its signal processing and display characteristics.

A transmitted RF signal is generated by combining a local oscillator (LO) signal, generated by a local oscillator 804 with a reference signal at the intermediate frequency (IF), produced by a reference signal generator 807 in a mixer 806. The RF signal becomes pulsed by passing it through an RF gate 808 which modulates it at a pulse repetition frequency (PRF). The RF pulses are amplified by a power amplifier 810, and pass through a circulator 812 to a Σ port 813 of a comparator 814.

An antenna assembly (array) 816, comprises four radiators 818-821, arranged in a horizontal row (with respect to the plane, when in straight and level flight). Phase shifters 822-825, between comparator 814 and the individual radiators, serve to steer the beams and a null in azimuth. The scheme, known in the art as monopulse, provides azimuth angle measurement relative to the antenna axis. Received sum (Σ) signal arrives via port 813 through circulator 812 to a receiving channel 826. Receiving channel 826 includes a low noise amplifier 828 (LNA), a first down converter 830, an IF amplifier 832 (IFA), and a second down converter 834 (also called a synchronous detector, or second detector). Received azimuth difference signal ($\Delta A_Z$) is fed to a second, identical receiving channel 826', whose elements have the same reference numbers as those in channel 826, primed.

The output of the second down converter in each channel is bipolar video (or "Doppler"), since its LO port is fed from the reference oscillator at the IF. The bipolar video is sampled and transformed into digital format, and it undergoes in phase and quadrature (I&Q) fast Fourier Transform (FFT) processing, in an FFT 836. The FFT results in a matrix of n rows corresponding to n range gates, and m columns, corresponding to m Doppler filters, having a total of n×m range-Doppler cells, each representing, a terrain element.

The signal levels stored in the matrix are compared to a noise riding threshold 838 (NRT). The NRT is based on measuring the noise level at transmission pauses, which take place periodically. During these pauses, the output of the FFT is the result of thermal noise, and possibly additional, external sources of noise. Signals whose levels surpass the NRT are considered "legitimate", and are fed to a processor 840.

The processor calculates the azimuth of each cell by comparing the recorded power levels, received through the sum and difference channels. In addition, ambiguities in the azimuth are removed. Elevation angle of each terrain cell is then calculated from its Doppler and azimuth. Both calculations are described in greater detail above and below. At this stage, range, azimuth and elevation of all terrain cells within the sensor's coverage are known, and the processor generates a 3D map or skyline contours, as well as special warnings for a display 842 (and headsets), when required. The radar system interfaces with other on board systems (navigation equipment, air data computer, audio system, display sub system etc.) to receive NAV data such as aircraft velocity, position of LOF and other data required for processing and for generating and delivering the display and warnings.

The radar apparatus can use (share) one or more of the organic displays of the aircraft, such as a head down display (HDD), a head up display (HUD) or a helmet mounted display (HMD)—if so equipped. If there are no organic displays in the aircraft, a dedicated display for the sensor can be installed. Otherwise, the display can be eliminated altogether, with warnings given to the crew orally.

Azimuth Angle Processing

The azimuth of each range-Doppler/terrain cell or obstacle is measured, according to one embodiment of the invention, using off axis monopulse angle estimation as known in the art. A common way to implement this scheme is to look at the ratio Δ/Σ of powers received in the difference and sum outputs of a monopulse antenna, for each range-Doppler cell, and at the phase relationship between the two. The power ratio provides a measure of the angle off the difference lobe null, and the phase provides the sign (side in relation to the null). A look up table, relating power ratio and phase to angle can be prepared in advance and stored in the processor. Both power levels and phases of the two values are taken from the FFT results.

The intersections of two conical surfaces representing the frequency coverage of a Doppler filter with flat terrain, result, in most practical cases, in two hyperbolas. The intersections of two range spheres representing the coverage of a range gate with the same terrain, result in two circles. The intersections of the hyperbolas and the circles on the terrain, result in two symmetrical range-Doppler cells (in fact, the two range-Doppler cells are symmetrical about the LOF only when terrain is flat and is not inclined sideways relative to the flight plane (FP) or is horizonal). However, for the sake of description simplicity, we will refer to one of the cells as the "cell of interest", and to the other as the "symmetrical cell". The range-Doppler cells look like four sided polygons.

Figure 9:
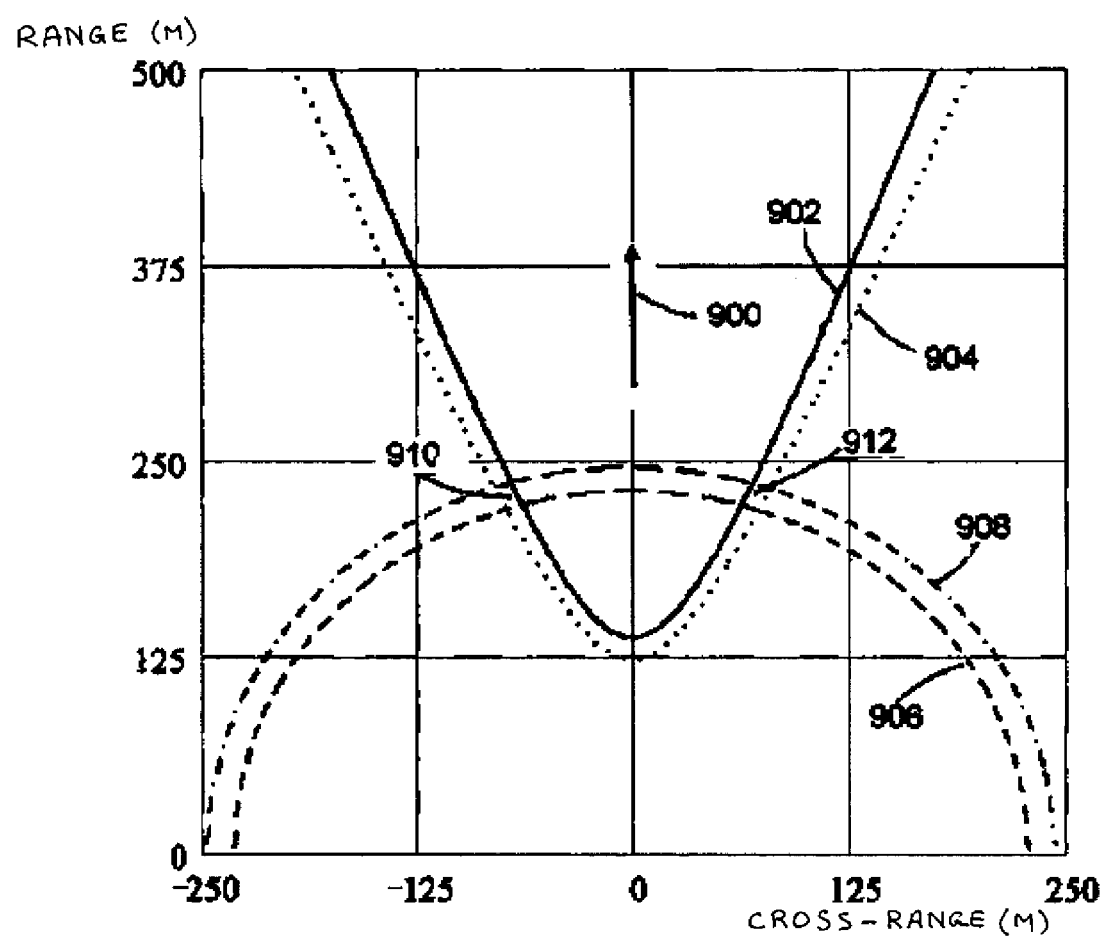
FIG. 9 shows hyperbolas created by intersections of conical surfaces related to a Doppler filter with flat, horizontal terrain, and circles created by intersections of range spheres related to a range gate, with same terrain, creating range-Doppler cells.

An example of such hyperbolas, circles and range-Doppler cells on the terrain is illustrated in FIG. 9. The two axes are calibrated in meters. The direction of the LOF is shown by an arrow 900. The half head angles of the two conical surfaces representing a Doppler filter (values of α) are 20° and 22° referenced as 902 and 904 respectively. The radiuses of the range spheres are 235 m and 250 m, referenced as 906 and 908 respectively. The flight altitude is 50 m. The two range-Doppler cells are indicated as 910 and 912 and are symmetrical about the LOF since terrain was flat and horizontal.

Figure 10:
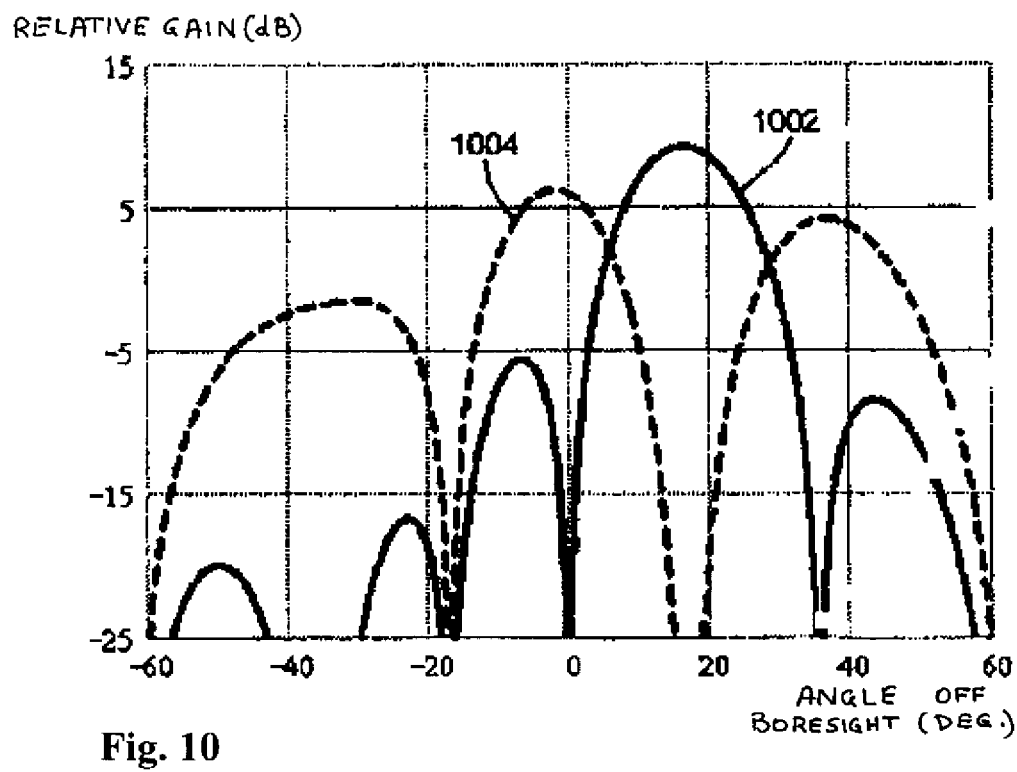
FIG. 10 shows the sum and difference radiation patterns of a monopulse antenna, comprising four radiators arranged horizontally (as in FIG. 8), in accordance with an embodiment of the invention.

To measure the azimuth of a cell, backscatter from the symmetrical cell should be eliminated from both of the received Σ and Δ signals used for the calculation. This can be done by directing nulls in both Σ and Δ antenna patterns at the symmetrical cell. To do so, appropriate phase shifts are applied to phase shifters connected to the antennas in the monopulse antenna assembly (FIG. 8). FIG. 10 shows a simulated radiation pattern of a usable monopulse antenna array, having sum 1002 and difference patterns 1004, and a null common to both, where the nulls in the patterns are directed together at the symmetrical cell.

The following representative example shows how this can be achieved. The horizontal axis shows azimuth in degrees. The vertical axis shows relative gain in dB. An antenna which is a linear array of four identical radiators (antennas), with a uniform spacing of 0.57λ among them is assumed. The radiation pattern of a single radiator is assumed to be a cosine function of θ. A weighting factor of 0.5 (in voltage) is applied to the outer radiators, to bring about positioning of a common null in both Σ and Δ patterns. A uniform phase shift is applied between adjacent radiators to position the common null at θ=−18° (changing phase shift would move the null, but would keep it common to both Σ and Δ patterns). At the same time, this phase shift has moved the peak of Σ to about +17°, allowing azimuth measurement in the region of 0 to +15°.

The initial pointing angle of the null will be determined through simulation, so as to provide the best suppression of the symmetrical cell backscatter, where it is needed most. It can of course be changed by the sensor during flight, as necessary.

In any case, a residual signal from the symmetrical cell will always be present, and might cause an error in the azimuth measurement. This error can be estimated from Meade's formula (see for example, Skolnik's "Introduction to Radar Systems", third edition, 2001, p. 230)

$$\frac{\Delta\theta}{\theta_D} = \frac{a^2 + a\cos\xi}{1 + a^2 + 2a\cos\xi} \quad \text{(Eq. 3)}$$

The formula allows estimation of the angular error $\Delta\theta$ in measuring the angle to a signal source, in the presence of another signal source having the same frequency. The parameters are the angular separation $\theta_D$ between two signal sources (the cell of interest and the symmetrical cell, in our case), the amplitude ratio (a) between the two signals (symmetrical over interest) and the phase difference $\xi$ between the two signals.

The integral (or average) of $\Delta\theta$, when $\xi$ changes from 0 to $2\pi$ is zero. Similarly, if results from a number of measurements, (each of them taken with a different, random value of $\xi$) are averaged, then the error tends to average out. It is expected that slight changes in geometry which take place among consecutive measurements will cause $\xi$ to have different, random and uniformly distributed values, averaging out the error. A way to enhance changes in $\xi$ between measurements is to change frequency between them, i.e., to use frequency diversity/agility. Depending on parameters, the process can be lengthy, since each measurement requires one FFT batch, which takes one integration period.

The time required for the process can be reduced, however, to one integration period, by performing the FFT processes at the different frequencies in parallel. This can conveniently be done thanks to the relatively long pulse repetition interval (PRI) which can be used due to the expected low Doppler frequency. The long PRI allows interleaving pulses of different frequencies, (being transmitted and received by the same transceiver).

Figure 11:
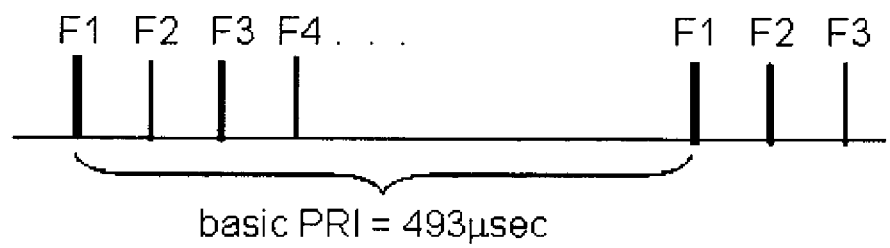
FIG. 11 shows an interleaving arrangement of pulses, having different frequencies, in accordance with an embodiment of the invention.

The scheme can be clarified by the following example: Suppose velocity is 70 m/sec (around 135 knots), and wavelength is 7 cm. Maximum Doppler is 2×70/0.07=2,000 Hz. The lowest required pulse repetition frequency (PRF) is a little higher than this figure—say 2030 Hz, so the PRI is 493 μsec. The required PRI for an instrumented range of, say, 1,500 m is only 10 μsec. We can therefore interleave many pulses, having different frequencies, as shown in FIG. 11.

Pulses F1 and F2 are separated from each other by more than 10 μsec (PRI required for instrumented range of 1,500 m), so that by the time pulse F2 is to be transmitted, all the echoes of interest from pulse F1 will have been received. The same is true for the separation between pulses F2 and F3, F3 and F4, and so on. If one wants to perform an FFT of, say, 128 points (pulses), than by the time 129 F1 pulses have been transmitted, 128 pulses of each of the other frequencies will have been transmitted too. Therefore, during that time (128× 493 μsec=63 msec, in our example), one can perform in parallel the FFT processes for all frequencies. One will have after that time the detected results of all frequencies, ready for summation/averaging. Of course, for different range requirements, wavelengths, velocities, etc., different values would apply.

This scheme of frequency diversity/agility has two additional advantages, not directly related to the basic function of the sensor:

a) Frequency agility improves the sensor's resistance to hostile electronic countermeasures (ECM), and makes it more difficult to detect by hostile electronic intelligence/electronic support measures (ELINT/ESM), giving it a lower probability of interception (LPI). Better ECM resistance and LPI features are desirable in military use; and b) Summation of FFT results from different frequencies, which is part of the averaging process, is equivalent to post detection integration, and therefore it improves probability of detection (Pd) for a given transmitted power, allowing a reduction in the transmitted power.

It should be noted that off-axis monopulse angle measurement as described above is not the only azimuth measuring scheme suitable for use in the invention. For example, the following is a description of a scheme based on interferometry (FIG. 12).

Figure 12:
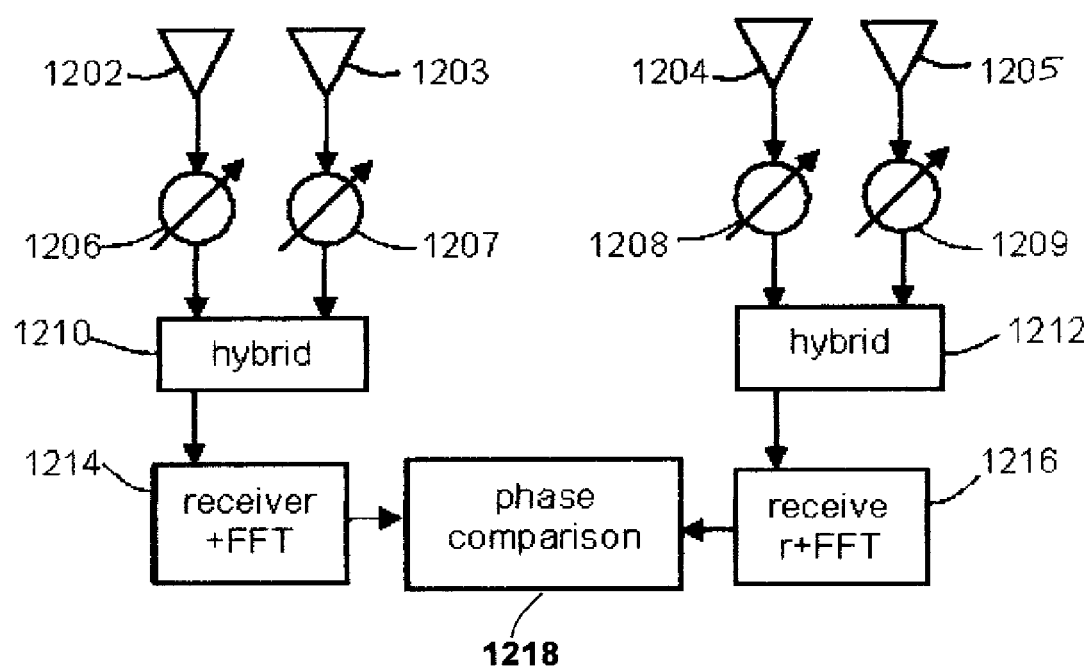
FIG. 12 is a schematic block diagram of a direction finding scheme based on interferometry, where each of the two antennas is an array of two radiators, generating a steerable null, in accordance with an embodiment of the invention.

FIG. 12 shows a system in which two pairs of antennas 1202, 1203 and 1204, 1205 are connected via variable phase shifters 1206-1209 to inputs of hybrids 1210 and 1212. Each pair of antennas forms, together with its connecting hybrid, an array. Two receivers 1214, 1216 are connected to the difference outputs of the hybrids, so that every one of the two arrays (pairs) has a null in its pattern, and the nulls can be pointed to any direction within a certain sector, by changing the phase shifts. Specifically, the nulls will be pointed at the symmetrical cell as before, in order to minimize the effect of the symmetrical cell on the measurement. Alternatively, the nulls can be steered by phase shifts performed digitally, after FFT (not shown).

The scheme has two receiving and processing channels, each fed by an antenna array. DF of the cell of interest is performed by phase comparison (in a phase comparator 1218) between its detected signals in the two channels. The antenna arrays can be expanded vertically to include elevation nulls (described below).

It should be noted that array antennas described above in this section and elsewhere in this application can also be formed digitally, by using a separate receiver and FFT process for each antenna radiator, and performing all adding, subtracting and phase shifting digitally, using the FFT results. This scheme is known in the art as digital beam forming (DBF). All the beams and nulls formed in this way exist only in the receiving portion of the sensor, and the transmitting beam has to be shaped in a conventional manner.

Calculation of Elevation/Depression Angle

Figure 13A:
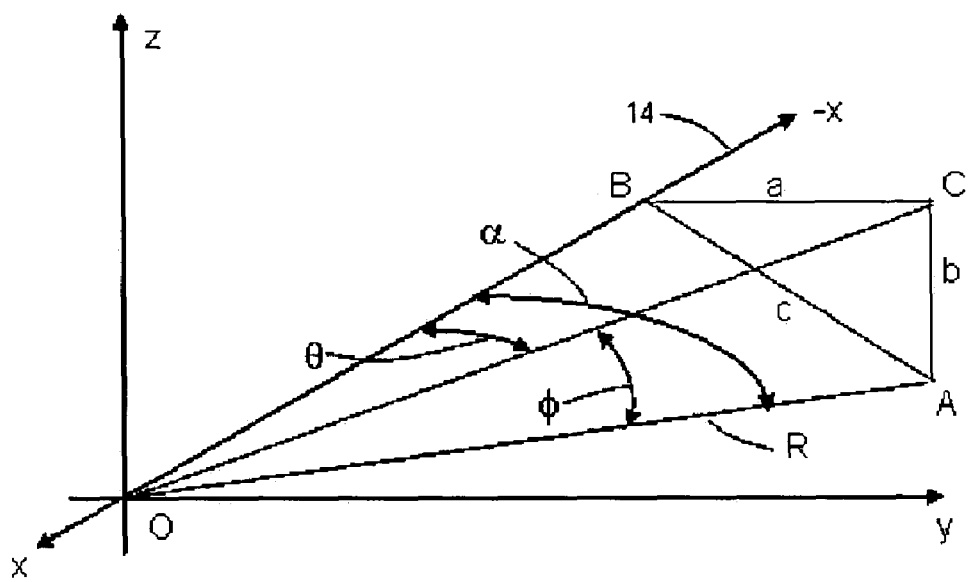
FIGS. 13A-13D illustrates the geometry of a radar system and an object, used to determine the relation between the object's angular distance from the line of sight, its azimuth and its elevation, in accordance with an embodiment of the invention.
Figure 13B:
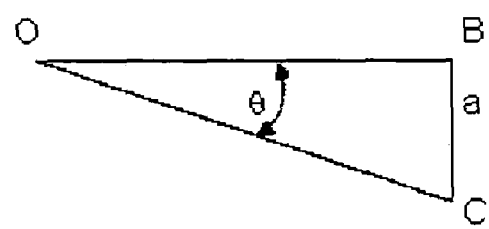
Figure 13C:
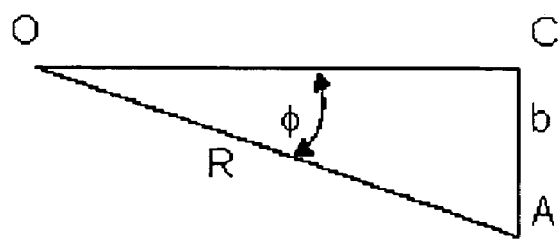
Figure 13D:
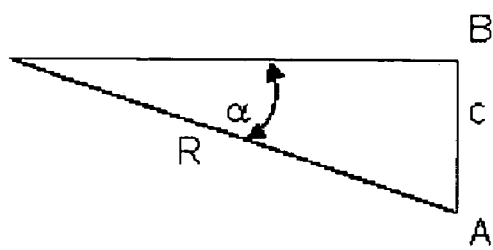

Once the azimuth angle of a terrain cell is known, its elevation/depression angle can be calculated geometrically, using the measured/calculated values of azimuth and $\alpha$. The geometry is described in FIG. 13A. FIGS. 13B-13D show three planar triangles used to derive the expressions below.

The symbol "O" is the location of the sensor which is the origin, where the sensor is located. The LOF coincides with the negative direction of the x axis. (A) denotes the position of the terrain cell of interest, whose azimuth is $\theta$ and whose elevation/depression is $\phi$. R (OA) is the range to the terrain cell. Triangle ABC is a right triangle in a plane parallel to the zy plane.

From the planar triangles the following relations can be derived:

$$(OC) = R\cos\phi \quad \text{(Eq. 4)}$$

$$a = (OC)\sin\theta = (R\cos\phi)\sin\theta \quad \text{(Eq. 5)}$$

$$b = R\sin\phi \quad \text{(Eq. 6)}$$

$$c = R\sin\alpha \quad \text{(Eq. 7)}$$

For right triangle ABC:

$$a^2 + b^2 = c^2 \quad \text{(Eq. 8)}$$

Expressing a, b, c in terms of Eq. 5 through 7 above, and solving for $\cos\phi$ yields the following expression:

$$\cos\phi = \frac{\cos\alpha}{\cos\theta} \qquad \text{(Eq. 9)}$$

This expression allows the calculation of $\phi$ from $\alpha$ (related to the specific Doppler) and $\theta$—the azimuth—obtained through the DF process. To eliminate the need for calculation, a two dimensional look-up table for $\phi$, as a function of $\theta$ and $\alpha$ can be prepared in advance from Eq. 9. The table will allow looking up the value of any combination of $\alpha$ and $\theta$.

The elevation angle calculation will still be valid during turns, when the aircraft is at a roll angle (bank), as long the azimuth angle is measured correctly.

Wire Detection and Recognition

Figure 14:
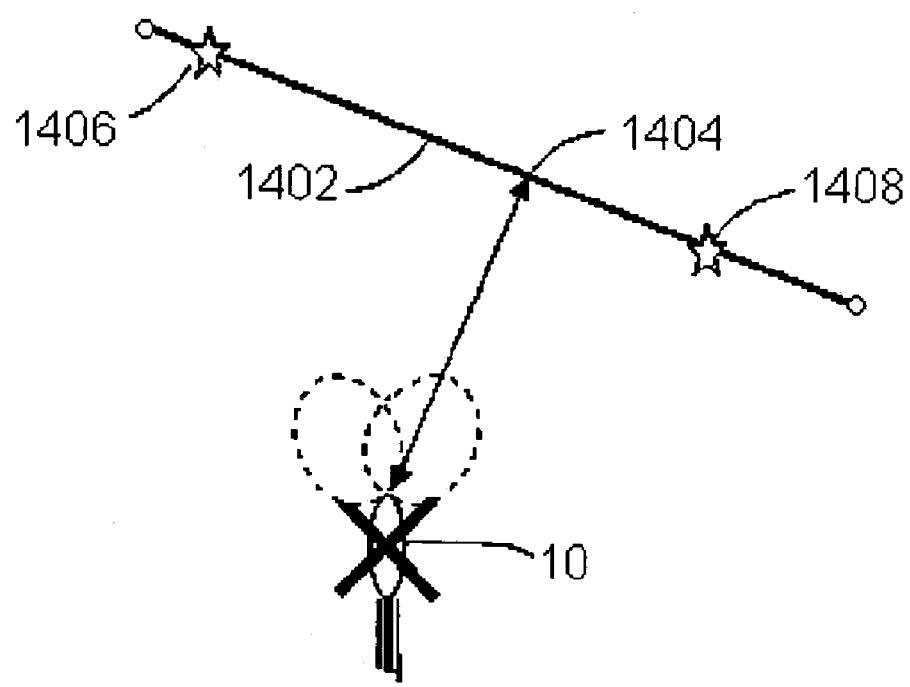
FIG. 14 shows the geometry of wire detection based on reflection from the point of normal impinging on the wire, in accordance with an embodiment of the invention.

The present invention, as described heretofore, has a partial capability to detect and recognize a suspended wire, or a groups of parallel suspended wires (as in high voltage power lines), as such. A wire 1402 reflects back electromagnetic energy from the point of normal impinging 1404 (PNI; the point on the wire—assumed here to be a straight line—at which a normal to the wire meets it, FIG. 14). This reflection would look to the computer like a point obstacle, and thus will not convey the true nature of a wire, which usually extends both ways from the impinging point, and constitutes a hazard also outside the PNI.

Wires can be recognized by the sensor, however, based on three special attributes they have, which are not usually possessed by point obstacles:

a) The PNI may be high enough, so as to look suspended. In other words, the PNI may appear at a certain elevation, while just below it (at the same range and azimuth) there is no backscatter. This does not generally occur with other types of obstacles.

b) In a common (and most dangerous) situation, the wires are in the same plane with the LOF (for example, when the wires are horizontal, and at the same height above ground level (AGL) as the aircraft). In this situation, the PNI will appear at a constant azimuth, with a constant closing rate and Doppler, as long as the aircraft advances in a straight line. This is not the case with point obstacles, which, unless very close to the LOF, will move in azimuth and change closing rate as the aircraft advances.

c) High voltage power lines are usually suspended from pylons (indicated at 1406, 1408), which are regularly separated from each other. If such a regular arrangement of point obstacles is found by the sensor, the presence of pylons can be suspected, and virtual wires can be drawn among them and displayed, with a proper warning of suspected wires.

It should be noted that this attribute of wires is not related to the detection of a PNI, and suspected wires can be declared and displayed based on it even when a PNI is not detected.

If a wire is declared or suspected using the above criteria, it may be also assumed to be horizontal, as is most likely (unless in a mountainous area). If this is the assumption, then the orientation of the wire in the horizontal plane can be calculated from the azimuth of the reflecting point (PNI), to which the wire is perpendicular. The wire can be displayed as such, with its orientation, on a PPI (plan position indicator), which provides a look of the aircraft and the terrain from above. While there is some sag in the wires, this effect is generally not significant in the context of the present invention.

A more reliable way to detect and recognize wires, is to use the method of U.S. Pat. No. 6,278,409 (Zuta), the disclosure of which is incorporated by reference, where wires are detected and discriminated from other objects using a polarimetric radar. Wire detection is now described, based on this patent, along with a number of additonal features. If the RF frequency is low enough (say, in L band,), the RCS of a wire is high in normal impinging (at the PNI), when the wave polarization is parallel to the wire. However, when wave polarization is perpendicular to the wire, the RCS is low. If the backscatter from a range-Doppler cell is strong in one polarization and weak in the orthogonal polarization, then the range-Doppler cell in question is likely to contain a reflection point (PNI) of a wire, which is parallel to the polarization that produced the stronger backscatter.

If only horizontal wires are to be detected and recognized, the sensor can switch between horizontal and vertical polarizations, or use both in parallel. If detected backscatter is considerably stronger in horizontal polarization than it is in vertical polarization, then it is likely that a horizontal wire (or a group of horizontal, parallel wires) has been detected. Measuring the azimuth and the elevation of the PNI will complete the wire information.

If slanted wires are also to be detected and recognized, than polarization has to be rotated—continuously or in steps (see below). In this case, backscatter received at any polarization is compared to backscatter received at the orthogonal polarization (measured earlier, later or at the same time). When a pair of two orthogonal polarizations is found, for which one backscatter is strong compared to the other, then a wire is likely to be present in the range-Doppler cell in question, and it is parallel to the wave polarization (orientation of the electric field) which produced the stronger backscatter. If the reflection point (PNI) is not at a high elevation, this orientation would also be the angle between the wire and a horizontal plane (slant angle). As a clarifying example, assume that such pair of orthogonal polarizations—one oriented 30° from the horizontal and the other oriented 120° from it, was found, and the stronger backscatter was received at the 30° polarization. The meaning is that the presence of a slanted wire is likely and it is oriented 30° from the horizontal. In this case (when the PNI is not at a high elevation), measuring the azimuth to the reflecting point and taking the normal to this azimuth will complete the knowledge of the wire's orientation in space.

If the PNI is at a high elevation, then the polarization, as well as both azimuth and elevation of the PNI would be required to determine the wire's orientation in space. The steps required to find this orientation are: (a) Measure azimuth and calculate elevation of line of sight (LOS) to PNI; (b) At the PNI (end of LOS), create a plane perpendicular to the LOS; and (c) Find a line in the plane, which is parallel to the polarization that produced the stronger backscatter, this line having the orientation of the wire in space.

Polarization rotation is also required when only horizontal wires are to be detected (see above), if the capability to detect and recognize wires has to be maintained when the aircraft has a roll angle (bank, during turns, for example). In this condition, polarizations have to be stabilized by polarization rotation.

Performing measurements while rotating polarization requires that FFT processes be performed at different polarizations. Here again, these processes can be done in parallel, in a way similar to the one described above with respect to frequency diversity, by interleaving time pulses of different polarizations.

The spatial coverage (field of regard) of the wire detection function has to be around 180°, since the aircraft might converge to a wire which is almost parallel to the LOF, and collide with it. In this case, the reflection point on the wire (PNI), which has to be detected, is close to 90° off the LOF.

Note that the use of higher resolution FFT (as described below) will also improve the signal to clutter ratio (of interest for wire detection, not terrain mapping), as it results in smaller range-Doppler cells. It is possible therefore that in cases where (wire) signal to clutter ratio is marginal, the wires will be detected only through the higher resolution FFT and not the regular FFT processes.

Figure 15:
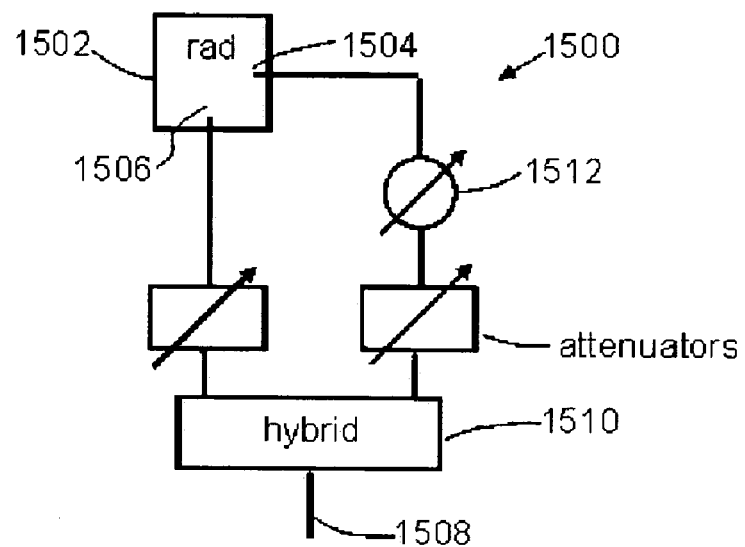
FIG. 15 is a schematic block diagram of a polarization rotation circuit, in accordance with an embodiment of the invention.

Though antenna polarization rotation can be implemented mechanically, it may be desirable to implement it electronically, using dual polarization radiators, phase shifters and attenuators, as known in the art. FIG. 15 shows such an implementation 1500 in a single antenna radiator—one of a number that can form an array, capable of polarization rotation.

Square 1502 represents a dual polarization radiation element, such as a microstrip (patch) antenna, fed by two signals through two points 1504, 1506. A signal at 1508 (in transmission) is divided into two channels by a hybrid 1510. A phase shifter 1512 switches between 0° and 180°. The attenuators provide continuous or stepped change of attenuation. The scheme provides a continuous or stepped change of polarization over 180°, which, effectively is the same as 360°. The lower antenna input produces vertical polarization. The side input produces horizontal polarization. By separately controlling the signal levels at the two, a resultant having a polarization anywhere within a sector of 90° can be created. Switching the phase shifter by 180° will add another 90° and producing a range of 180°.

As mentioned above in this section, recognition of wires through polarization rotation requires a relatively low frequency. On the other hand, terrain and obstacle mapping can (but does not have to) use a higher frequency, which will reduce FFT processing time and allow a higher rate of information. It is conceivable that the radar apparatus will contain two transceivers for the two functions, or just one for the two.

Resolving Elevation/Depression Angle Ambiguity

Note that the calculation of $\phi$ is ambiguous in the sense that its value can be negative, signifying depression, and positive, signifying elevation. In other words, as any calculated value of $\phi$ may mean either depression or elevation, both have, in principle, to be displayed, so every terrain element or obstacle will have an image, and it may not be known which is the true element and which is the image.

This is generally an unacceptable ambiguity, because the crew has to know where the terrain or obstacle is actually situated, in order to maneuver and avoid them when necessary. Following is a description of ways to resolve the ambiguity and maintain flight safety.

Figure 16:
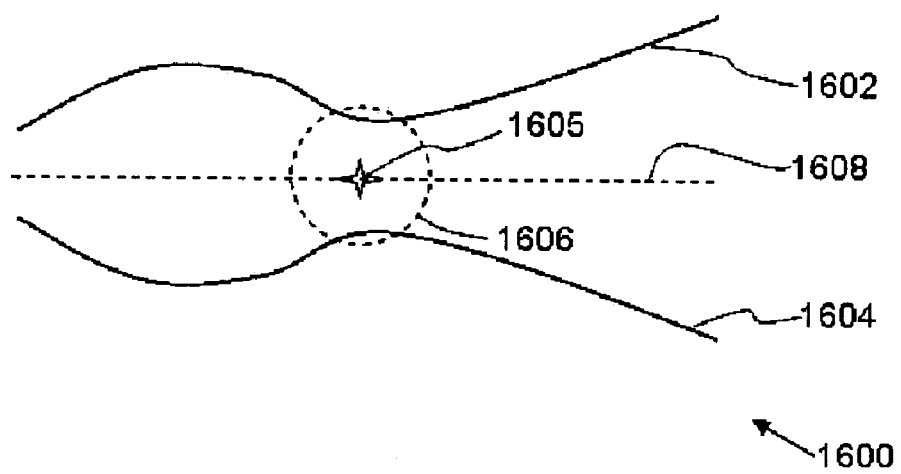
FIG. 16 is an example of a contour display, showing a skyline contour, its image, the line of flight, the flight plane and a safety circle, in accordance with an embodiment of the invention.

FIG. 16 shows an example of a skyline contour type display 1600 (see further description of the display below), if ambiguity is not resolved. This "display" shows two contours, an upper contour 1602 and a lower contour 1604. From this display it is not known which of the contours (upper or lower) is the true contour. As an example of this ambiguity, consider a situation in which the FP is pointing below the skyline. In this situation, the true contour on the display is the upper one, and the lower contour is the image, contrary to a simplistic conclusion that might be made by the crew based on the display. Also shown on the display are line of flight symbol 1605, a safety circle 1606 and the flight plane 1608. Of course, not all of these symbols and lines need actually be shown on the display, while other symbols may be added.

Figure 17A:
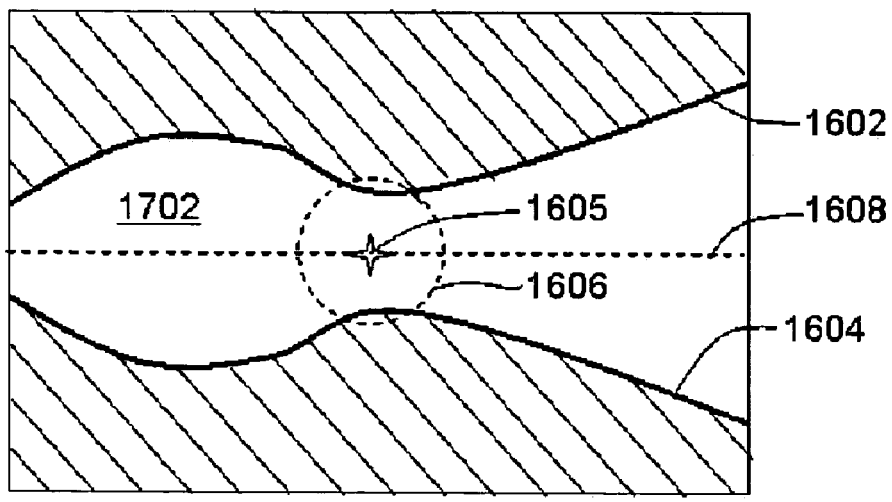
FIG. 17A is an example of a contour display, showing a skyline contour and its image, along with backscatters from terrain below the skyline, where the skyline is below the line of flight, in accordance with an embodiment of the invention.
Figure 17B:
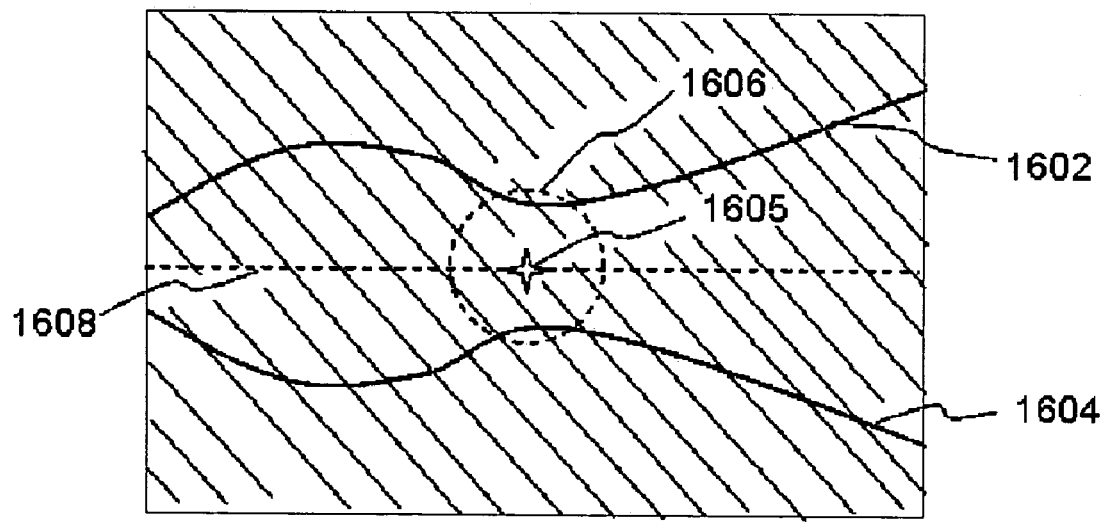
FIG. 17B is an example of a contour display as in FIG. 17A, where the skyline is above the line of flight, in accordance with an embodiment of the invention.

One way to resolve the ambiguity is based on terrain scatterers (range-Doppler cells) below the skyline, and the way they appear on a contour display. If the display picture is drawn with these scatterers (see below, under description of the display), there are two relevant possible cases:

a) The FP is pointing above the skyline, and the lower contour is the true one. In this case, the scatterers (shown by hatching on the Figs.) are below the lower contour 1604, and their images are above the upper contour 1602, while the area between the two contours 1702 is empty of scatterers (FIG. 17A).

b) The FP is pointing below the skyline, and the upper contour is the true one. In this case, all the scatterers related to the lower contour are located above it, and fill the space between the contours, because the lower contour and its scatterers are images. The scatterers of the upper contour, being true ones, are below it. The result is that the space between the contours 1602 contains true and image scatterers, and so are, in principle, the spaces below and above the lower and upper contours (FIG. 17B).

The system can sense whether the space between the contours is empty of scatterers and decide whether case (a) or case (b) exists. In both cases, the system will eliminate the image contour from the display. In both cases, it will eliminate also those of the scatterers which are above the upper contour. Note that this resolution scheme may be implemented based on the contour concept, not only when such a display is actually presented to the crew, but also without presenting it, within the processor.

It also possible that the FP is above parts of the skyline, and below other parts of it. In this case each part of the contour will be treated according to the above procedure, to produce a contour, all the parts of which are true.

Another way to resolve this ambiguity is to perform a pull up maneuver. As a result, in the example above in this section (FP pointing below the skyline), the FP will point closer to the skyline. The true (upper) contour will get closer to the FP symbol, and the lower contour will also get closer to the FP symbol from below, to maintain symmetry about the FP, as implied by Eq. 9 above. The two contours will thus get closer to each other. The system will sense this movement of the contours, deduce from it that the lower contour is the image and eliminate it from the display.

If the FP is actually pointing above the skyline, then the lower contour is the true one. In this case, the pull up maneuver will cause the two contours to move apart from each other. This movement means to the system that the upper contour is the image, and it will eliminate it from the display.

Similarly a push down maneuver can be used to resolve the ambiguity, except that closing of contours will mean now that the image is the upper contour, and separation of the contours will mean that the lower contour is the image.

A way to resolve elevation ambiguity of wires or tall distinct obstacle which protrude above a contour, is to use the pull up or pull down maneuver (above) as it is done for the contour ambiguity. This way elevation ambiguity of all horizontal wires can be resolved.

An additional way to resolve elevation ambiguity for a tall distinct object is to use logic stating that such an obstacle must be connected to a real cell. One way to do so is to compute a contour at the range of the obstacle. Once the contour and its image are available, the true contour and true obstacle connected to it are selected as described above.

A variation of the wire case is the slanted wire (described above). Since the vertical orientation of the wire is determined from the polarization and not through mapping, the true and image lines representing the wire will be parallel to each other, and not image pictures of each other. Image resolution in this case, however, will still be as for the horizontal wire above.

Yet another way to resolve the elevation ambiguity does not require a maneuver, and is usable for terrain, wires and tall distinct obstacles. It is based on pointing of a null in the antenna elevation pattern at one of the contours (or wire symbols). The result of the elevation/depression calculation is the angle φ, and the correct position of the object can be φ below FP or φ above it. To find Qut which of these possibilities is the true one, a null in the elevation antenna pattern can be pointed at the lower angle (φ below FP). If a decrease in detected echo power is sensed, then the lower angle is the true object position and the higher angle points at the image. If no decrease is sensed, then the object is at the higher angle (φ above FP). In a similar way, ambiguity can be resolved by pointing the null at the high angle.

Figure 18:
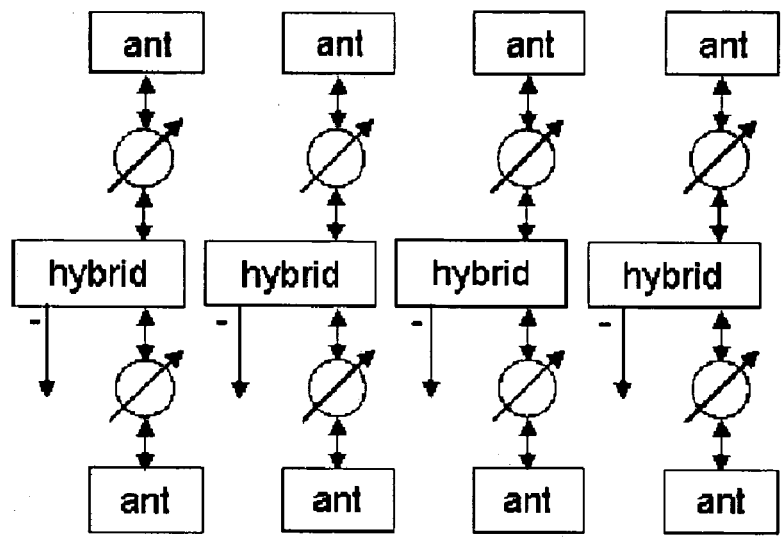
FIG. 18 is a schematic block diagram of a monopulse antenna having the radiation patterns of FIG. 10, to which a second row of radiators have been added, to enable the creation of a steerable null in its elevation pattern, in accordance with an embodiment of the invention.

The required elevation null can be created by replacing each radiating element in the antenna of FIG. 8, by two elements, arranged one above the other, as illustrated in FIG. 18.

Antenna radiators are shown as squares. Each of the original radiators in FIG. 8 is now replaced by an assembly which contains two radiators, connected to a hybrid through phase shifters. The difference output of the hybrid is used, and the assembly produces a null, that can be pointed at any elevation within a known elevation sector, by appropriately adjusting the phase shifters (one of the phase shifters in each assembly can be eliminated by replacing it with a fixed phase shift component). The principle of generating and pointing the null is similar to the one described above for the azimuth null.

Note that the ambiguity resolution procedure for a wire or tall distinct obstacle can be done separately from the resolution of ambiguity for terrain and point obstacles (as described above in this section), and in parallel to it.

Effect of Specular Multipath Reflection and Clutter on Elevation Angle Accuracy

Multipath Reflection.

Elevation angle measurement accuracy is often degraded by the presence of a ground reflection of the target's echo (known in the art as multipath effect), and clutter below the object. This effect takes place when the antenna radiation pattern in the vertical plane is wide enough to "see" the reflection point (and this is usually true in the case of the present invention). The effect is expected in the present invention in regard to elevation of an object, even though elevation may not be actually measured, but calculated. The effect is expressed in the multipath reflection having a slightly different Doppler than that of the object, possibly affecting the measured value of α, and therefore the calculated elevation. Additional contribution to the Doppler error results from clutter.

Figure 19:
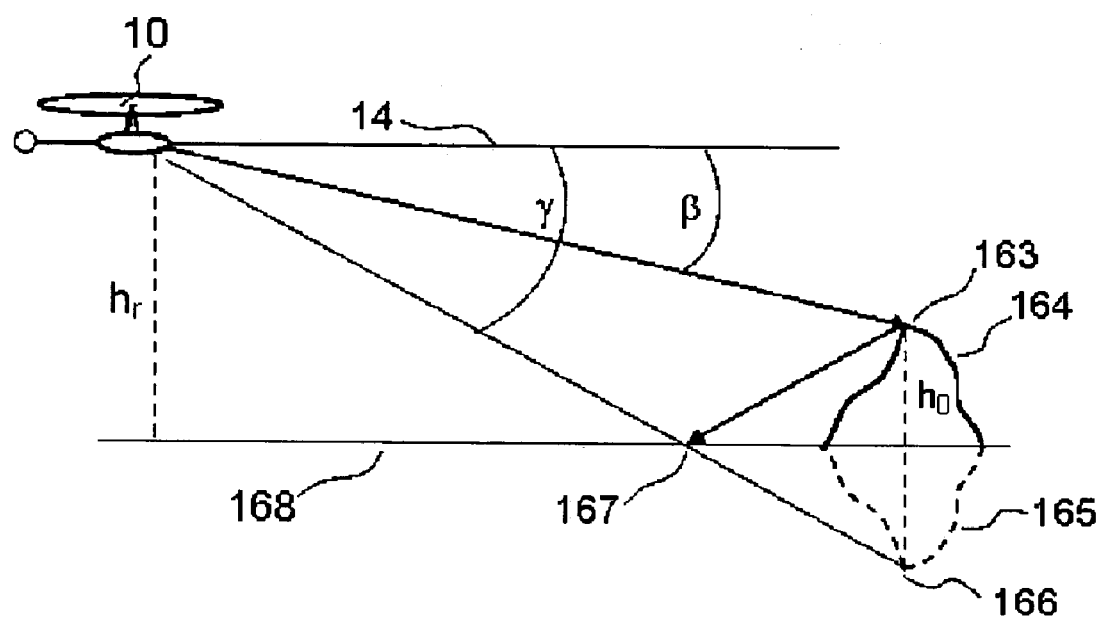
FIG. 19 shows the geometry of an aircraft flying horizontally over flat terrain, and an object protruding above the terrain, this geometry allowing to calculate the Doppler shifts of the object's tip and its multipath image, in accordance with an embodiment of the invention.

FIG. 19 illustrates the geometry of specular reflection in a typical case. Assume for simplicity that the azimuth θ of a tip 164 of an object 163, is zero. It can then be shown that the Doppler shift, $f_{do}(t)$, of the object's tip echo can be expressed as:

$$f_{do}(t) = -\frac{2}{\lambda} \cdot \frac{d}{dt}\left[\sqrt{(r_0 - v_g \cdot t)^2 + (h_r - h_0)^2}\right] \quad \text{(Eq. 10)}$$

and the Doppler shift of the tip's reflection image, $f_{di}(t)$, can be expressed as:

$$f_{di}(t) = \frac{f_{do}(t)}{2} - \frac{1}{\lambda} \cdot \frac{d}{dt}\left[\sqrt{(r_0 - v_g \cdot t)^2 + (h_r + h_0)^2}\right] \quad \text{(Eq. 11)}$$

where:
$h_r$ is aircraft's altitude and
$h_o$ is object tip's height.

The expression is valid and identical either when $h_r > h_o$ or when $h_r < h_o$.

Figure 20:
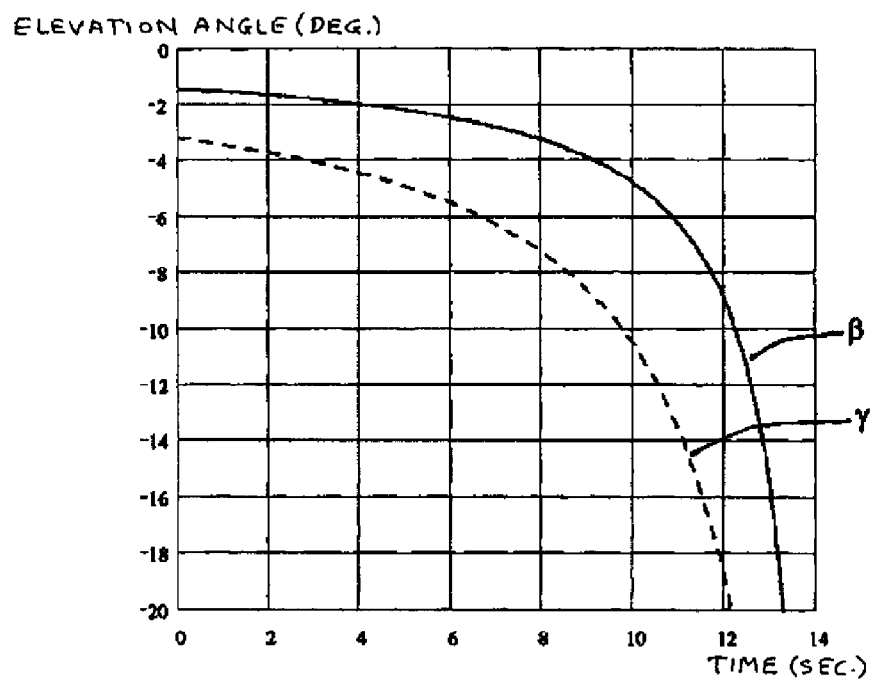
FIG. 20 is a graph showing elevation angles of the object's tip of FIG. 19 and its multipath image, as calculated by their measured Doppler shifts, in accordance with an embodiment of the invention.

For a reflection from ground 168 at a point 167, the object's tip 163 and it's reflection image 166 (tip of 165) elevation angles, β and γ (respectively) can be calculated from these Doppler shifts by Eq. 1 above. These calculated angles, are plotted in FIG. 20, for the following set of parameters:
$r_0$=1,000 m
$h_r$=50 m
$h_o$=25 m
$v_g$=70 m/sec.
"$r_0$" being the horizontal range to object or to object's tip.

The horizontal axis shows time in seconds. The vertical axis shows elevation angle in degrees. At t=0, range is 1,000 m, and object overpass is at 14.3 sec.

|γ| is always greater than |β|. β is the actual elevation of the object's tip, because it was calculated from the Doppler shift of the direct return from it. While γ represents the multipath reflection, whether or not γ is the true elevation of the multipath reflection point may not be of concern to the present invention.

Depending on the width of the Doppler filter and the other parameters, signals related to these two angles can fall in separate filters or within one filter.

In the first case (β and γ in separate filters), measured value of β is basically unaffected by the ground reflection.

In the second case (both in same filter, typically at a longer range and/or lower flight altitude), as the sensor performs interpolation, the resulting Doppler is shifted down by the ground (multipath and clutter) reflections. This shift down in the measured Doppler translates into a larger measured depression.

One way to separate object's backscatter from its ground reflections is based on a possible difference in range between the two, where the two may fall within different range gates.

Correcting Elevation when Object and Ground Reflections Fall within Same Doppler Filter.

a) Assume presence of a reflection image and clutter. Estimate through simulation the error caused by the reflections. The value of this error may be fixed or possibly dependent on object's range, its measured elevation result and the aircraft's altitude above ground level (AGL). Correct β upwards according to the estimate. The correction will be inaccurate, but may be adjusted to result in most cases in presenting a higher obstacle, possibly requiring a stronger avoidance maneuver, so that flight safety is not jeopardized by the inaccuracy.

b) Assume that only one ground reflection exists (multipath or clutter). Try to separate the two signals (object and ground reflection for example), in a way analogous to the separation of two targets in azimuth in a scanning radar, based on the resulting antenna pattern recorded from the intensity of the reflected echoes (see Skolnik's "Introduction to Radar Systems, third edition, 2001. p. 147, bottom). Here, the scanning movement of the antenna has to be replaced by moving, in frequency, of the Doppler filter bank. This can be done by changing the frequency of the reference oscillator (FIG. 8).

c) Search with a null in the elevation antenna pattern (as described above) below measured value of β, for a point where measured β changes up, indicating that the ground reflections have been attenuated by the null, and providing a more accurate value of β. Searching with a null requires performing of a number of FFT processes to find the correct pointing. These FFT processes may be done in parallel, in a way similar to the way described above with respect to frequency diversity, interleaving pulses of different null positions.

d) Employ, in parallel to the basic FFT processes mentioned above, a higher resolution FFT process. As an example, an FFT process with a duration of one second will provide 1 Hz resolution, and will have a better chance to separate the object's backscatter from the ground reflections, meaning that they do not fall within the object's Doppler filter. It can be shown that a ground return which was still not separated from the object's backscatter using 1 Hz filters will not cause a significant elevation error. The higher resolution FFT will provide better elevation accuracy at a longer delay, and after the object has already been detected and its elevation calculated through the regular resolution FFT. It is not advisable, however, to delay the display of the object until the higher resolution result is available. Instead, the object can be displayed with degraded accuracy as soon as it is available, possibly with corrections as described in a, b and c, with its accuracy improved later by the high resolution process.

Note that the use of the higher resolution FFT will result also in better azimuth resolution, and will generally reduce the size of the range-Doppler cell, reducing clutter backscatter which competes with wires and tall discrete obstacles.

Aside from the methods described above to reduce the effect of ground reflection, it should be pointed out that the multipath reflection can be weakened in the elevation sector around the Brewster angle by the use of vertical polarization, as known in the art. Therefore, vertical polarization should generally be preferred over horizontal polarization, except for wire detection.

It should be noted that elevation ambiguity discussed above and ground reflections are two different and unrelated effects. These two effects may be addressed separately and in parallel. It appears that ground reflection requires correction mainly for distinct objects, such as wires, tall discrete obstacles or steep slopes.

An Alternative Elevation/Depression Angle Measurement Scheme

In a different embodiment of the invention, elevation angle $\phi$ of each range-Doppler cell is measured by a conventional DF scheme, while azimuth angle $\theta$ of the cell is computed from $\alpha$ and elevation angle $\phi$, using Eq. 9 above.

In this case there is no elevation ambiguity, but multipath and clutter ground reflections are expected and may have to be suppressed by performing a number of measurements and averaging the results, as it is done in suppression of the symmetrical cell (above). At the same time, an azimuth null may have to be pointed at the symmetrical cell which exists here as before. This null will also serve to resolve the azimuth ambiguity resulting in this case from Eq. 9. The two procedures (eliminating the symmetrical and the ambiguity) are separate effects that have to be addressed separately and in parallel by the same scheme of nulling (the symmetrical cell and the ambiguity image in azimuth may not be collocated in azimuth).

It should be noted that the ambiguity resolution method based on contours and scatterers (above) is not feasible in this case, and a method analogous to the pull-up or push down maneuver (left or right turns) may not be desirable in this case.

If nulling is used to suppress ground reflections in this case, the scheme can be similar to the one illustrated in FIG. 18, except that the array has to be rotated 90° (to have two columns of 4 radiators each). Elevation will be measured using the off axis monopulse scheme, the ground reflection will be suppressed by the common null (FIG. 9 above), and the symmetrical cell signal will be suppressed by the null used earlier to attenuate the elevation image or ground reflections.

Effect of residual ground reflections, present after pointing a null at the ground reflectors, can be averaged out through frequency diversity/agility, as described above.

A further refinement of the elevation measurement can be achieved here (as in azimuth, described above) by track smoothing, such as provided by the Kalman filter.

Generating Displays and Warnings

Generating a 3D Terrain and Obstacle Map, with Special Warnings

Based on the coordinates R, $\theta$, and $\phi$ obtained so far for each terrain element or obstacle, a 3D map for the terrain can be readily generated. Point obstacles like pylons and towers will also appear on the map. If tall enough, these may extend vertically over more than one cell on the map, especially when higher resolution FFT is employed. These obstacles will usually have specific reflection intensities, related to their specific RCS values, usually different from their surrounding terrain. The obstacles will be distinguishable to the computer, and if their intensity is expressed in the map, they will be detectable to the eye, due to their contrast. As the angular distance of any cell from the LOF ($\alpha$) is known, a special warning can be displayed, accompanied by an aural signal, to notify the crew of a condition where the value of $\alpha$ of a specific cell or obstacle or group of cells/obstacles is smaller then a predetermined (or adapting) safety value. If actual impact (zero $\alpha$) is predicted, a more severe warning can be given, along with an indication of the time to impact (TTI).

Display of detected wires, if implemented can also be combined with the 3D map display.

Generating Terrain Contours

Figure 21:
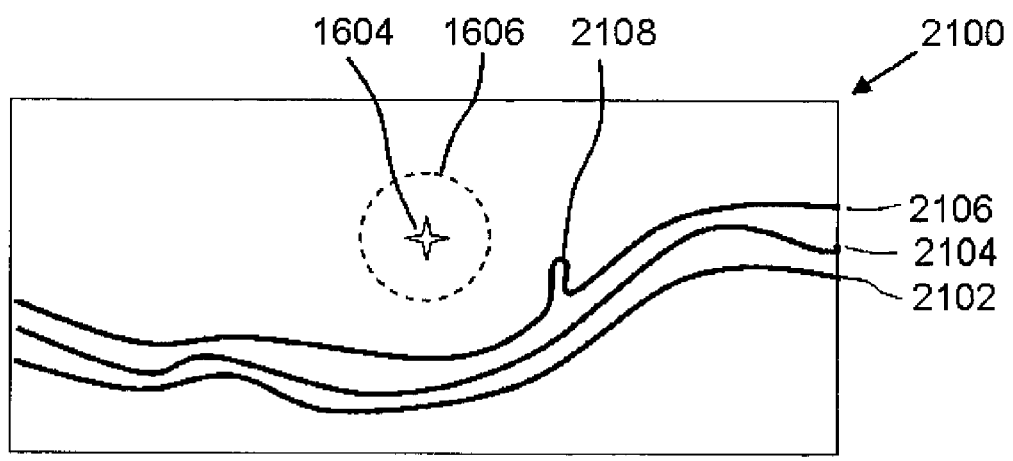
FIG. 21 is an example of a contour display, comprising the line of flight symbol, a safety circle and three skyline contours related to three different ranges, in accordance with an embodiment of the invention.

A different kind of display which can be generated from the 3D data is a skyline contour display, which may possibly be easier for the crew to interpret. Generation of such contours (whether displayed or not) may also facilitate resolving elevation ambiguity, as described above. An example of such a display 2100, is shown in FIG. 21.

A lower trace 2102 is the contour at a relatively short range, such as 200 m (600'). A middle trace 2104 is the contour at a middle range, such as 500 m (1,500'), and an upper trace 2106 is the contour at a longer range, such as 1,000 m (3,000'). Note an obstacle at 2108.

The crew can assess the angular displacement of the LOF symbol from the contours and maintain adequate clearance from them, with the aid of the safety circle. It should be noted that the radius of the safety circle 1606 (which represents a safety value for $\alpha$) may be related to range. For example, in order to keep a fixed clearance from a terrain cell or obstacle along the flight path, a bigger radius (corresponding to a greater value of $\alpha$) is required at a short range, and a smaller radius is required at a long range. A number of safety circles, related to a number of contour ranges may therefore be displayed. Alternatively, a single safety circle, related to the closest contour, may be displayed.

To assist in elevation ambiguity resolution, and possibly for enhancing situation awareness, contour display has to include also backscatterers which are located at elevations and ranges below these of the skyline contour itself.

As in the terrain mapping example, described above, special alarms can be presented on the contour display and sounded in the headsets.

PPI Display of Wires

The horizontal position and orientation of a wire may require yet another style of display, such as the plan position indicator (PPI), which provides a view of the aircraft and wire from above.

The vertical position and orientation of a wire, however, can be presented by combining it into the contour display which provides a look from the cockpit along the LOF and around it. If both orientations are available, it may be useful to alternate between the contour and PPI displays, so as to present both orientations to the crew.

It should be noted that these display concepts are just a few samples of a large variety of possibilities, and that the styles of display can be shaped at will to the operational requirements of a real system.

A Simplified Sensor and Display

A significant simplification and saving in hardware and software can be achieved by using a single radiator antenna, and eliminating any DF and "nulling" (suppression of a signal by pointing a null at its direction). Doppler processing is performed as described above, resulting in a division of the space in front of the aircraft into range-Doppler cells.

Azimuth and elevation of terrain cells or obstacles are not known to the sensor and cannot be displayed in this embodiment. However, range and angular displacement from the LOF, $\alpha$, are known. Conditions in which the angular displacement of a cell/object is smaller than the safety margin are sensed and displayed, and additional special warnings can be generated, displayed and sounded.

Figure 22:
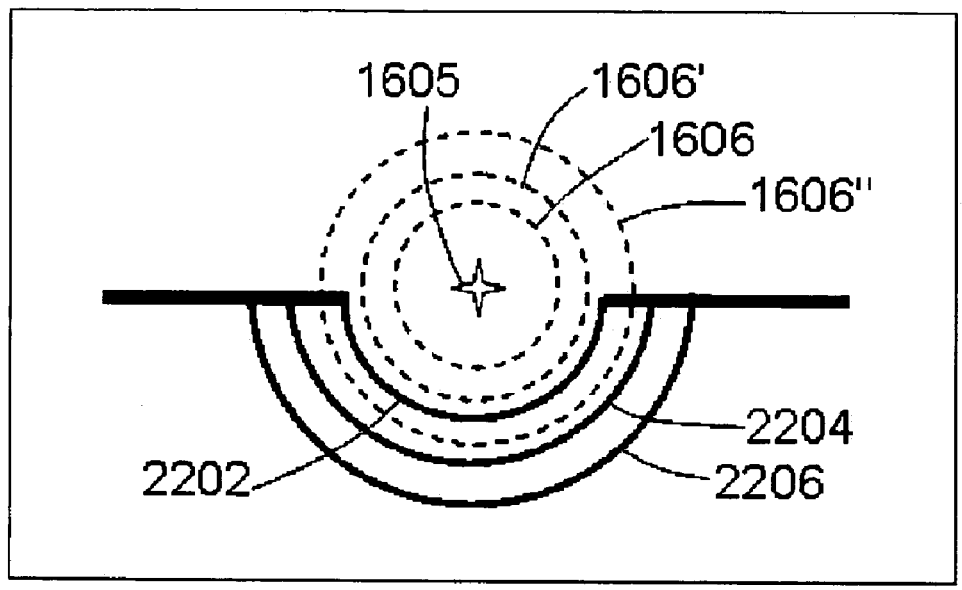
FIG. 22 is an example of a simplified contour display in which the contours are distorted and appear as half circles, in accordance with an embodiment of the invention.

An example of a possible display format for this embodiment is shown in FIG. 22. Displayed are safety circles 1606, 1606' and 1606" for three ranges. Displayed also are terrain contours (2202, 2204, 2206) for corresponding ranges, which are deformed and appear as half circles. As long as a terrain contour for a certain range is outside the corresponding safety circle, situation is safe. If a contour has contracted and entered its corresponding safety circle (associated to the same range), it is not known to the crew where (at what angle) is the obstacle or terrain feature that caused this condition, but a strait pull up maneuver would constitute an appropriate safety maneuver.

If desired, a crude indication of the side (left or right) and azimuth of a large obstacle can be provided with a relatively small change in the system. This capability utilizes two channels, comprising, each, an antenna and a transmit/receive channel. The two antennas are squinted out from each other in a horizontal plane, such that one is looking a little to the right of the aircraft's longitudinal axis, and the other a little to the left of it, while also sharing a common sector. Comparison between signal strengths of the same range-Doppler cells in the two channels, will provide a left/right indication.

The same indication can be achieved also with a single channel, switching between the two antennas (or a two radiator antenna array whose lobe can be switched between the two azimuth positions). This scheme will require at least two FFT periods to provide the indication, whereas the two channel scheme can use a single FFT period. This difference between the two embodiments in not significant, however, if pulses received by the single channel from the two antennas or two antenna positions are interleaved in a way pulses of different frequencies are interleaved (as described above). This way, the two FFT processes are performed practically in parallel (simultaneously). It should be noted that the DF scheme described above is but one of a number of possible DF schemes that are known in the art and can be used to provide the side indication.

Wire detection and recognition can also be provided by this variant, using polarization switching or rotation. If wires are a priori assumed horizontal and at low elevation, the use of two antennas (as above) will also provide an indication of the side (right or left) of the reflection point. Based on knowledge of the side and the Doppler of the reflection point (PNI), an azimuth to the PNI (that is, azimuth of the line of sight) can be calculated from Eq. 1 above. As the wire is normal to the line of sight (LOS) of the PNI, its orientation in the horizontal plane can also be calculated and displayed. Alternatively, if higher elevation horizontal wires are to be detected and recognized, azimuth of the PNI can be found using the two antennas in a conventional DF method, such as amplitude comparison.

Slanted wires can equally be detected, recognized and displayed with their horizontal orientation and slant angle in the simplified sensor, using polarization rotation. This orientation, as well as the slant angle (in case polarization rotation is employed) can be practically accurate if the wire's PNI is not at a high elevation angle.

It should be pointed out that the above schemes, of calculating the azimuth to the reflection point, based on Doppler and the side on which the object is situated or on conventional DF are only applicable to wires (and not to other obstacles and terrain features). The reason is that the side or coarse azimuth of the wire's reflection point can be clearly determined in this simplified sensor, since the reflection point of a wire does not have a symmetrical point to it. The other obstacles and terrain features do have, in principle, symmetrical cells, which have to be cancelled by nulling and averaging (not a feature of the simplified sensor).

Despite this limitation, the capability to provide crude indication of the side and azimuth of a large object (described earlier in this section) still exists, since a large object is not likely to have a symmetrical range-Doppler cell of comparable RCS.

It is also conceivable that the simplified embodiment be used as a mode in one of the other embodiments described above, in case of loss of the LOF information, or due to another malfunction which may warrant this mode.

This mode may also be used in cases where a newly detected object constitutes a collision hazard, being close enough to the LOF, and at a short range. Upon detection (possibly after one FFT period) the sensor will display the situation in the simplified mode. It will then revert to normal mode after azimuth and elevation will have been measured, possibly taking a few more FFT periods, if interleaving of pulses does not allow completion of all processes during one FFT period.

It is understood that the above detailed description describes only some embodiments of the invention. Variations on the above detailed description will occur to persons of the art. These include, the following non-exclusive listing:

a) In the description above, an off axis monopulse azimuth estimation is included. It should be noted that this is not the only usable azimuth angle measuring scheme. Other schemes, such as interferometry (also described) are also usable. The choice of the scheme may be affected by antenna type, size and installation, component selection and other considerations.

b) The description does not include pulse compression (PC). PC can be used in order to reduce the required peak RF power (meaning a better LPI feature) while maintaining a good signal to clutter ratio and good range resolution, and achieving better resistance against extraneous or jamming pulses.

c) The description does not include a Sensitivity Time Control (STC) feature. Such feature may be utilized in order to reduce the overall required dynamic range, and can be implemented using circuitry known in the art.

d) If wire detection capability is included, a constant false alarm rate (CFAR, adaptive threshold), as known in the art, may also be added.

e) It should be understood that the architecture of the radar system, described above, represents just one way of implementing the required radar receiver/transmitter, and many other ways to implement it exist (in addition to the variants shown above). Examples of different implementations include, but are not limited to, another antenna, other arrangements for the generation of the RF and reference signals, and other schemes of generating the output transmitted pulse.

As used herein, the terms "include," "comprise" and "have" and their conjugates, means "including but not necessarily limited to."

The invention claimed is:

1. A method of terrain mapping and/or obstacle detection for aircraft, comprising:
   (a) transmitting a non-scanning beam that illuminates the terrain and/or obstacles;
   (b) receiving a Doppler shifted signal that is Doppler frequency shifted by an amount dependent on an angle between a line of flight of the aircraft and scatterers that reflect the transmitted beam;
   (c) determining the angle from the Doppler frequency;
   (d) determining the range of at least some of said scatterers; and
   (e) determining the azimuth and elevation of the scatterers,
   wherein a backscatter Doppler signal from a terrain cell or object, located on the opposite side of the aircraft's line of flight from a range cell or object of interest and falls within the same range cell and same Doppler filter is suppressed by a null, common to both sum and difference patterns of an antenna receiving said Doppler shifted signal.

2. A method according to claim 1 wherein determining the azimuth and angle comprises:
   determining one of azimuth and elevation of the scatterers by direction finding; and
   calculating the other of the azimuth and elevation from the angle and determined azimuth and elevation.

3. A method according to claim 2 wherein determining the azimuth or elevation comprises determining using an off-axis monopulse azimuth estimation scheme.

4. A method according to claim 2 wherein determining the azimuth or elevation comprises determining using interferometry.

5. A method according to claim 1 and including:
   displaying a three dimensional map in which cells defined by different values of azimuth, elevation and range containing a backscatter signal are located.

6. A method according to claim 1 and including:
   displaying a three dimensional terrain map in which the relative backscatter intensity of cells defined by different values of azimuth, elevation and range is expressed.

7. A method according to claim 1 and including:
   generating and displaying skyline contours based on cells defined by different values of azimuth, elevation and range.

8. A method according to claim 7 and including displaying backscatterers which are at lower elevation and lower range than the skyline.

9. A method according to claim 7 and including displaying at least one safety circle superimposed on the skyline display.

10. A method according to claim 9 and including displaying a plurality of safety circles for a plurality of ranges.

11. A method according to claim 1 and including providing aural or visual warnings when the aircraft is moving in an unsafe direction.

12. A method according to claim 1 wherein determining the angle comprises:
    providing a plurality of signals, each representing the strength of the Doppler shifted signal from a scatterer in one of a plurality of adjacent, overlapping, frequency ranges; and
    determining the frequency of the Doppler frequency signal by interpolation based on the signal strengths.

13. A method according to claim 1 wherein determining the angle comprises:
    performing spectral analysis, in which at least some signals from scatterers fall within one of a plurality of Doppler filters, said Doppler filter containing said signal determining the Doppler shift of the signal, from which the angle is calculated.

14. A method according to claim 13, wherein results from a number of adjacent Doppler filters, corresponding to backscatter from at least one sector away from the aircraft's line of flight, are summed or averaged.

15. A method according to claim 14 wherein results from sectors relatively closer to the line of flight are either not summed or averaged or are summed or averaged to a lesser extent than those farther from the line of flight.

16. A method according to claim 1 wherein determining the angle includes:
    repeating at least (a) and (b) and optionally (c) a plurality of times; and
    averaging the determined Doppler shifted frequencies or angles determined in each repeat.

17. A method according to claim 16 wherein only a limited range of angles about the line of flight is determined using a limited range of Doppler frequencies.

18. A method according to claim 1 wherein an error resulting from a residue of the suppressed backscatter is averaged out by summing or averaging multiple measurements, taken at a single frequency or at multiple frequencies.

19. A method according to claim 18 wherein said multiple measurements are performed at different frequencies and wherein pulses of the transmitted radiation at different frequencies are transmitted seriatim, in an interleaved manner.

20. A method according to claim 19 wherein determination of the angle by spectral analysis of the reflections for the different frequencies are performed in parallel, utilizing said interleaved pulses.

21. A method according to claim 1 wherein, if the determination of angle, azimuth and range results in an elevation or azimuth ambiguity of a surface contour or wire or tall discrete obstacle indication, the method includes:
    resolving the ambiguity by pointing a null in the elevation or azimuth pattern of an antenna to either or both of the indications of a scatterer;
    sensing a difference in the object's backscattered power; and
    choosing the direction of the null which caused a decrease of received power as the correct direction.

22. A method according to claim 1 wherein, ground reflections are separated from actual object backscatter, based on a difference in Doppler shift between the object's backscatter and its ground reflections.

23. A method according to claim 22 in which the differences in Doppler shift are quantized to form a plurality of ranges of Doppler shift defining a plurality of ranges of the angle, wherein ground reflections detected in a same range of distances as the actual object are separated from the object, based on their falling in different ranges of Doppler shift.

24. A method according to claim 1 in which the differences in Doppler shift are quantized to form a plurality of ranges of Doppler shift defining a plurality of ranges of the angle and the effect of ground reflections is detected in a same range of Doppler shifts and distances as the actual object, the effect of the ground reflections is reduced by pointing a null in an antenna pattern towards the general direction of the reflection sources at an elevation angle lower than that indicated by the combined directly reflected and ground reflected signals.

25. A method according to claim 1, and including:
deducing of the presence of a wire based on detection of a regular spacing between point obstacles, indicating that these obstacles may be pylons, carrying wires.

26. A method according to claim 1, and including:
detecting suspended wires, based on normal impingement of said beam; and
determining the presence of the wire by:
irradiating the wire with radiation at two orthogonal polarizations; and
determining the presence of the wire from a ratio of received backscatter intensities in the two polarizations.

27. A method according to claim 26 and including determining the orientation of wire by rotating the polarization and finding a pair of orthogonal polarizations for which the ratio of intensities of received backscatters is above a certain threshold, the wire being parallel to the orientation which produced the stronger backscatter.

28. A method according to claim 27 and including determining the orientation of a wire in the vertical plane, provided a point of normal incidence is at low elevation, and where the slant angle of the wire is parallel to the polarization that produced the strongest backscatter.

29. A method according to claim 26, including determining the wire's orientation in space, where a point of normal incidence need not be limited to low elevation, said determining comprising:
a) determining the azimuth and elevation of line of sight to a detected point of normal incidence;
b) determining a plane normal to the line of sight at the point of normal incidence; and
c) determining a line in the plane, parallel to the polarization which produced the strongest backscatter, said line estimating the spatial orientation of the wire.

30. A method according to claim 26, wherein said determining the angle comprises:
determining a roll angle of the aircraft; and
rotating transmitted polarized radiation to compensate for the roll angle of the aircraft.

31. A method according to claim 1 and including determining the horizontal orientation of wires at low elevation, the method comprising:
determining the azimuth of wire's reflection point; and
estimating the horizontal orientation as the normal to the determined azimuth.

32. A method according to claim 1, and including:
detecting suspended wires, based on normal impingement of said beam; and
discriminating wires from other objects when the reflecting point on the wire appears to be at constant azimuth as the aircraft advances, as long as the wire and the line of flight are in substantially a same elevation plane.

33. A method according to claim 32, where discriminating wires from other objects is further based on a discontinuity of backscatter in the elevation plane, when no backscatter comes from elevations between the wire's reflection point and the ground.

34. A method according to claim 1, wherein said receiving a Doppler shifted signal includes receiving:
interlacing pulses having different attributes of frequency, antenna connection, beam position or polarization; and
utilizing the Doppler shifts of reflections of the interlaced pulses to perform spectral analysis of the reflections at different attributes, in parallel.

35. A method according to claim 34, including:
detecting suspended wires, based on normal impingement of said beam; and
determining the presence of the wire by:
irradiating the wire with radiation at two orthogonal polarizations; and
determining the presence of the wire from a ratio of received backscatter intensities in the two polarizations.

36. A method according to claim 35 and including determining the horizontal orientation or wires at low elevation, the method comprising:
determining azimuth of wire's reflection point; and
estimating the horizontal orientation as the normal to the determined azimuth.

37. A method according to claim 34 wherein the spectral analysis comprises FFT.

38. A method according to claim 34 wherein the attributes comprise frequency.

39. A method according to claim 34 wherein the attributes comprise polarization.

40. A method according to claim 34 wherein the attributes comprise antenna connection.

41. A method according to claim 34 wherein the attributes comprise beam position.

42. A method according to claim 1, comprising
determining a line of flight of an aircraft; and
detecting wires over an angle of over ±70° in azimuth about the line of flight.

43. A method according to claim 42 wherein said angle is equal to or below ±90°.

44. A method according to claim 42 wherein said angle is above ±90°.

45. A method according to claim 1 wherein the non-scanning beam is pointed substantially along a direction of flight of the aircraft.

46. A method according to claim 1 wherein the non-scanning beam is electronically steerable only in a single plane.

47. A method according to claim 46 wherein the single plane is a substantially horizontal plane when the aircraft has substantially a zero roll angle.

48. A method according to claim 1 wherein the beam is transmitted and received via a same antenna.

49. A method according to claim 1 and including resolution of elevation ambiguity comprising:
determination of skyline contours, possibly containing tall, discrete obstacles, from said elevation, range and azimuth, said skyline contours including an upper contour and a lower contour, only one of which is real.

50. A method according to claim 1 and including discriminating wires from other objects based on a discontinuity of backscatter in the elevation plane, when no backscatter comes from elevations between the wire's reflection point and the ground.

51. A method of terrain mapping and/or obstacle detection for aircraft, comprising:
(a) transmitting a non-scanning beam that illuminates the terrain and/or obstacles;
(b) receiving a Doppler shifted signal that is Doppler frequency shifted by an amount dependent on an angle between a line of flight of the aircraft and scatterers that reflect the transmitted beam;
(c) determining the angle from the Doppler frequency;

(d) determining the range of at least some of said scatterers; and (e) determining the azimuth and elevation of the scatterers; and (f) resolving elevation ambiguity by:

determining skyline contours, possibly containing tall, discrete obstacles, from said elevation, range and azimuth, said skyline contours including an upper contour and a lower contour, only one of which is real;

if the area between the contours is substantially empty of measured scatterers, then the lower contour is chosen as the real contour; and if the area between the contours contains a substantial number of scatterers, then the upper contour is chosen as the real contour.

52. A method according to claim 51 wherein if parts of the contours have scatterers between them and other parts do not, each such part is treated separately according to said acts of determination of skyline contours.

53. A method according to claim 51 and comprising displaying only the chosen contour on a visual display.

54. A method according to claim 51 wherein, if the determination of angle, azimuth and range results in an elevation ambiguity of a surface contour, wire or tall discrete obstacle indication, the method includes resolving the ambiguity by a pull-up or push-down maneuver of the aircraft.

55. A method according to claim 54 wherein, if the maneuver is a pull-up maneuver that causes the upper and lower contours or wire or tall discrete obstacle indication to move apart from each other, then the lower contour or indication is determined to be the correct contour or indication and vice-versa; and if the maneuver is a push-down maneuver that causes the upper and lower contours or indications to move apart from each other, then the upper contour or indication is determined to be the correct contour or indication, and vice-versa.

56. A method of terrain mapping and/or obstacle detection for aircraft, comprising:

(a) transmitting a non-scanning beam that illuminates the terrain and/or obstacles;

(b) receiving a Doppler shifted signal that is Doppler shifted by an amount dependent on an angle between a line of flight of the aircraft and scatterers that reflect the transmitted beam;

(c) determining the angle of an object or terrain cell nearest to the line of flight at a certain range; and (d) displaying a distorted contour in the form of a half circle around the line of flight, whose radius represents the angular distance of this object from the line of flight.

57. A method according to claim 56 and including displaying a number of distorted contours for a number of ranges, along with a number of safety circles for corresponding ranges.

58. A method according to claim 56 and including making a coarse determination of azimuth, providing rough azimuth of large objects.

59. A method according to claim 58 wherein the beam is transmitted and received via a same antenna.

60. A method according to claim 56 and including determining the horizontal orientation of wires at low elevation, the method comprising:

determining azimuth of wire's reflection point; and estimating the horizontal orientation as the normal to the determined azimuth.

61. A method according to claim 56 wherein the non-scanning beam is pointed substantially along a back to front axis of the aircraft.

62. A method according to claim 56 wherein the non-scanning beam is electronically steerable only in a single plane.

63. A method according to claim 62 wherein the single plane is a substantially horizontal plane when the aircraft has substantially a zero roll angle.

* * * * *